(12) United States Patent
Zhang

(10) Patent No.: US 12,008,794 B2
(45) Date of Patent: Jun. 11, 2024

(54) SYSTEMS AND METHODS FOR INTELLIGENT VIDEO SURVEILLANCE

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

( * ) Notice: Subject to any disclaimer, the term of this patent is extended or adjusted under 35 U.S.C. 154(b) by 523 days.

(21) Appl. No.: 17/239,536

(22) Filed: Apr. 23, 2021

(65) Prior Publication Data

US 2021/0241468 A1 Aug. 5, 2021

Related U.S. Application Data

(63) Continuation of application No. PCT/CN2019/113176, filed on Oct. 25, 2019.
(Continued)

(51) Int. Cl.
G06T 7/292 (2017.01)
G06F 18/214 (2023.01)
(Continued)

(52) U.S. Cl.
CPC .......... *G06V 10/255* (2022.01); *G06F 18/214* (2023.01); *G06N 3/08* (2013.01);
(Continued)

(58) Field of Classification Search
CPC ...... G06V 10/255; G06V 20/52; G06V 20/10; G06T 7/80; G06T 7/292; G06T 7/246; G06F 18/214; G06N 3/08
See application file for complete search history.

(56) References Cited

U.S. PATENT DOCUMENTS 4,337,481 A 6/1982 Mick et al.
5,956,424 A 9/1999 Wootton et al.
(Continued)

FOREIGN PATENT DOCUMENTS

CN 105760849 A 7/2016
CN 108062349 A 5/2018
(Continued)

OTHER PUBLICATIONS

International Search Report in PCT/CN2019/113176 dated Feb. 1, 2020, 4 pages.
(Continued)

*Primary Examiner* — David F Dunphy
(74) *Attorney, Agent, or Firm* — METIS IP LLC

(57) ABSTRACT

A method may include obtaining a video collected by a visual sensor, the video including a plurality of frames and detecting one or more objects from the video in at least a portion of the plurality of frames. The method may also include determining a first detection result associated with the one or more objects with a trained self-learning model. The method may further include selecting a target moving object of interest from the one or more objects at least in part based on the first detection result. The trained self-learning model may be provided based on a plurality of training samples collected by the visual sensor.

20 Claims, 9 Drawing Sheets

Related U.S. Application Data

(60) Provisional application No. 62/750,795, filed on Oct. 25, 2018, provisional application No. 62/750,797, filed on Oct. 25, 2018.

(51) Int. Cl.
*G06K 9/00* (2022.01)
*G06K 9/62* (2022.01)
*G06N 3/08* (2023.01)
*G06T 7/246* (2017.01)
*G06T 7/80* (2017.01)
*G06V 10/20* (2022.01)
*G06V 20/10* (2022.01)
*G06V 20/52* (2022.01)

(52) U.S. Cl.
CPC .............. *G06T 7/246* (2017.01); *G06T 7/292* (2017.01); *G06T 7/80* (2017.01); *G06V 20/10* (2022.01); *G06V 20/52* (2022.01)

(56) References Cited

U.S. PATENT DOCUMENTS

| | | |
|---|---|---|
| 7,036,094 B1 | 4/2006 | Cohen et al. |
| 7,847,820 B2 | 12/2010 | Vallone et al. |
| 2004/0130620 A1 | 7/2004 | Buehler et al. |
| 2008/0260212 A1 | 10/2008 | Moskal et al. |
| 2010/0298656 A1 | 11/2010 | McCombie et al. |
| 2012/0163670 A1 | 6/2012 | Eaton et al. |
| 2013/0266925 A1 | 10/2013 | Nunamaker, Jr. et al. |
| 2017/0109613 A1* | 4/2017 | Kolavennu ............ G06V 20/52 |
| 2019/0130189 A1* | 5/2019 | Zhou .................. G06V 10/7515 |

FOREIGN PATENT DOCUMENTS

| | | |
|---|---|---|
| CN | 108447076 A | 8/2018 |
| EP | 2963593 A1 | 1/2016 |

OTHER PUBLICATIONS

Written Opinion in PCT/CN2019/113176 dated Feb. 1, 2020, 4 pages.

Charles J. Cohen et at., Behavior Recognition Architecture for Surveillance Applications, 2008 37th IEEE Applied Imagery Pattern Recognition Workshop, 2008, 8 pages.

\* cited by examiner

800

SYSTEMS AND METHODS FOR INTELLIGENT VIDEO SURVEILLANCE

CROSS-REFERENCE TO RELATED APPLICATIONS

This application is a continuation of International Patent Application No. PCT/CN2019/113176, filed on Oct. 25, 2019, which claims priority of U.S. Provisional Application No. 62/750,795, filed on Oct. 25, 2018, and U.S. Provisional Application No. 62/750,797, filed on Oct. 25, 2018, the contents of each of which are hereby incorporated by reference.

TECHNICAL FIELD

The present disclosure generally relates to systems and methods for video surveillance systems, and more particularly relates to systems and methods for smart motion detection.

BACKGROUND

Video surveillance systems have been widely used in a variety of environments such as buildings, subway stations, airports, city streets, vehicles, etc. A video surveillance system usually includes multiple cameras for capturing videos. The captured videos are usually reviewed by observers or users to detect what happens in the environment and/or monitor the behaviors of objects in the environment.

However, in some situations, the cameras are recording for long periods of time, hence requiring the observers or users to spend long hours to review the video so not to miss important information. With the multiplicity of video surveillance systems and cameras, it is neither economical nor efficient to review the videos by human beings. However, the current automatic review systems are not inaccurate and/or expensive. Therefore, it is desirable to provide video surveillance and analysis systems for that can efficiently and effectively recognize the objects in the captured videos, understand the what has happened in the videos between the objects (and/or the behaviors of the objects), and generate alarms or notifications based on the observations.

SUMMARY

According to an aspect of the present disclosure, a system for video surveillance is provided. The system may include a storage device storing a set of instructions; and at least one processor may be configured to communicate with the storage device. When executing the set of instructions, the at least one processor may be directed to cause the system to perform the following operations. The system may obtain a video collected by a visual sensor, the video may include a plurality of frames. The system may detect one or more objects from the video in at least a portion of the plurality of frames. The system may determine a first detection result associated with the one or more objects with a trained self-learning model. The system may select a target moving object of interest from the one or more objects at least in part based on the first detection result. The trained self-learning model may be provided based on a plurality of training samples collected by the visual sensor.

In some embodiments, the at least one processor may be directed to cause the system to perform the operations including detecting the one or more objects from the video using an object detection model.

In some embodiments, the object detection model may be constructed based on a deep learning model.

In some embodiments, to determine a target moving object of interest from the one or more objects at least in part based on the first detection result, the at least one processor may be further directed to cause the system to perform the following operations. The system may determine one or more behavior features associated with the one or more objects based on the at least a portion of the plurality of frames. The system may determine a second detection result associated with each of the one or more objects based on the one or more behavior features associated with each of the one or more objects. The system may determine the target moving object of interest from the one or more objects based on the first detection result and the second detection result.

In some embodiments, to determine one or more behavior features associated with the one or more objects, the system may determine the one or more behavior features based on the at least a portion of the plurality of frames and a prior calibration model of the visual sensor determined in a last calibration.

In some embodiments, the one or more behavior features of the one or more objects may include at least one of a speed, an acceleration, a trajectory, a movement amplitude, a direction, a movement frequency, or voice information.

In some embodiments, the trained self-learning model may be generated by a process. The process may include obtaining the plurality of training samples. Each of the samples may include a historical video collected by the visual sensor. The process may include detecting one or more motion subjects from the historical video for each of the plurality of training samples; and training a self-learning model using information associated with the detected one or more motion subjects to obtain the trained self-learning model.

In some embodiments, the information associated with the detected one or more motion subjects may include at least one of time information when the detected one or more motion subjects recorded by the historical video; spatial information associated with the detected one or more motion subjects; weather information when the detected one or more motion subjects recorded by the historical video; or motion information of the detected one or more motion subjects.

In some embodiments, the trained self-learning model may include a first part relating to reference knowledge of different scenes and a second part relating to learned knowledge generated from a training process of the trained self-learning model.

In some embodiments, the reference knowledge of different scenes may include characteristics of one or more subjects appeared in each of the different scenes.

In some embodiments, the first detection result may include one or more first candidate moving objects of interest and the second detection result may include one or more second candidate moving objects of interest, and to determine a target moving object of interest from the one or more objects based on the first detection result and the second detection result. The system may designate a same candidate moving object of interest from the one or more first candidate moving objects of interest and the one or more second candidate moving objects of interest as the target moving object of interest.

In some embodiments, the first detection result may include a first probability that each of the one or more objects is a moving object of interest, the second detection result may include a second probability that each of the one or more objects is a moving object of interest, and to determine a target moving object of interest from the one or more objects based on the first detection result and the second detection result, the system may designate a moving object having a first probability exceeding a first threshold and a second probability exceeding a second threshold as the target moving object of interest.

In some embodiments, the system may generate feedback relating to the detection of the target moving object of interest in response to a detection of the target moving object of interest from the video. The system may transmit the feedback relating to the detection of the target moving object of interest to a terminal.

In some embodiments, the first detection result may include one or more first candidate moving objects of interest and the second detection result may include one or more second candidate moving objects of interest, and to determine a target moving object of interest from the one or more objects based on the first detection result and the second detection result, the system may designate a same candidate moving object of interest from the one or more first candidate moving objects of interest and the one or more second candidate moving objects of interest as the target moving object of interest.

In some embodiments, the first detection result may include a first probability that each of the one or more objects is a moving object of interest, the second detection result may include a second probability that each of the one or more objects is a moving object of interest, and to determine a target moving object of interest from the one or more objects based on the first detection result and the second detection result, the system may designate a moving object having a first probability exceeding a first threshold and a second probability exceeding a second threshold as the target moving object of interest.

In some embodiments, the at least one processor may be directed to cause the system to perform additional operations. The at least one processor may be directed to cause the system to generate feedback relating to the detection of the target moving object of interest in response to a detection of the target moving object of interest from the video. The at least one processor may be directed to cause the system to transmit the feedback relating to the detection of the target moving object of interest to a terminal.

In some embodiments, the at least one processor may be directed to cause the system to perform additional operations. The at least one processor may be directed to cause the system to generate candidate feedbacks each of which relates to the detection of one of the one or more objects in response to a detection of each of at least a portion of the one or more objects from the video. The at least one processor may be directed to cause the system to determine target feedback from the candidate feedbacks based on at least one of the first detection result and the second detection result. The at least one processor may be directed to transmit the target feedback to a terminal.

In some embodiments, the feedback or the target feedback may include a notification indicating that a moving object exists.

In some embodiments, the at least one processor may be further configured to cause the system to perform additional operations. The at least one processor may be further configured to cause the system to determine a calibration model of the visual sensor, the calibration model describing a transform relationship between a two-dimensional (2D) coordinate system and a three-dimensional (3D) coordinate system of the visual sensor based on the target moving object of interest.

In some embodiments, to determine a calibration model of the visual sensor based on the target moving object of interest, the at least one processor may be further configured to cause the system to perform the additional operations. The at least one processor may be further configured to cause the system to determine an estimated value of a characteristic of at least one of the target moving object of interest denoted by the 2D coordinate system based on the at least a portion of the plurality of frames. The at least one processer may determine the calibration model based on the estimated value and a reference value of the characteristic of the at least one of the target moving object of interest denoted by the 3D coordinate system.

In some embodiments, the characteristic of the at least one of the target moving object of interest may include a physical size of at least a portion of the at least one of the target moving object of interest.

In some embodiments, the target moving object of interest may include at least one of a person, a vehicle, or an animal whose motion includes an anomaly.

In some embodiments, the feedback or the target feedback may include a notification indicating that a moving object exists.

In some embodiments, the at least one processor may further be configured to cause the system to perform additional operations. The at least one processor may further be configured to cause the system to determine, based on the target moving object of interest, a calibration model of the visual sensor, the calibration model describing a transform relationship between a two-dimensional (2D) coordinate system and a three-dimensional (3D) coordinate system of the visual sensor.

In some embodiments, to determine a calibration model of the visual sensor based on the target moving object of interest, the at least one processor may be further configured to cause the system to perform the additional operations. The at least one processor may be further configured to cause the system to determine an estimated value of a characteristic of at least one of the target moving object of interest denoted by the 2D coordinate system based on the at least a portion of the plurality of frames. The at least one processor may be further configured to cause the system to determine the calibration model based on the estimated value and a reference value of the characteristic of the at least one of the target moving object of interest denoted by the 3D coordinate system.

In some embodiments, the characteristic of the at least one of the target moving object of interest may include a physical size of at least a portion of the at least one of the target moving object of interest.

In some embodiments, the target moving object of interest may include at least one of a person, a vehicle, or an animal whose motion includes an anomaly.

According to an aspect of the present disclosure, a method for video surveillance is provided. The method may be implemented on a computing device having at least one processor and at least one computer-readable storage medium for abnormal scene detection. The method may include obtaining a video collected by a visual sensor. The video may include a plurality of frames. The method may include detect one or more objects from the video in at least a portion of the plurality of frames. The video may include determining a first detection result associated with the one or more objects with a trained self-learning model. The video may include selecting a target moving object of interest from the one or more objects at least in part based on the first detection result. The trained self-learning model may be provided based on a plurality of training samples collected by the visual sensor.

According to an aspect of the present disclosure, a non-transitory computer readable medium for video surveillance is provided. The non-transitory computer readable medium may include obtaining a video collected by a visual sensor. The video may include a plurality of frames. The non-transitory computer readable medium may include detecting one or more objects from the video in at least a portion of the plurality of frames. The non-transitory computer readable medium may include determine a first detection result associated with the one or more objects with a trained self-learning model. The non-transitory computer readable medium may include select a target moving object of interest from the one or more objects at least in part based on the first detection result. The trained self-learning model may be provided based on a plurality of training samples collected by the visual sensors.

According to an aspect of the present disclosure, a device for video surveillance is provided. The one or more visual sensors each of the device may include a storage device storing a set of instructions. At least one processor may be configured to communicate with the storage device, when executing the set of instructions, the at least one processor may be directed to cause the system to perform operations. The at least one processor may be directed to cause the system to obtain a video collected by one of the one or more visual sensors, the video including a plurality of frames. The at least one processor may be directed to cause the system to detect one or more objects from the video based on at least a portion of the plurality of frames. The at least one processor may be directed to cause the system to determine a first detection result associated with the one or more objects based on a trained self-learning model. The at least one processor may be directed to cause the system to select a target moving object of interest from the one or more objects at least in part based on the first detection result.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
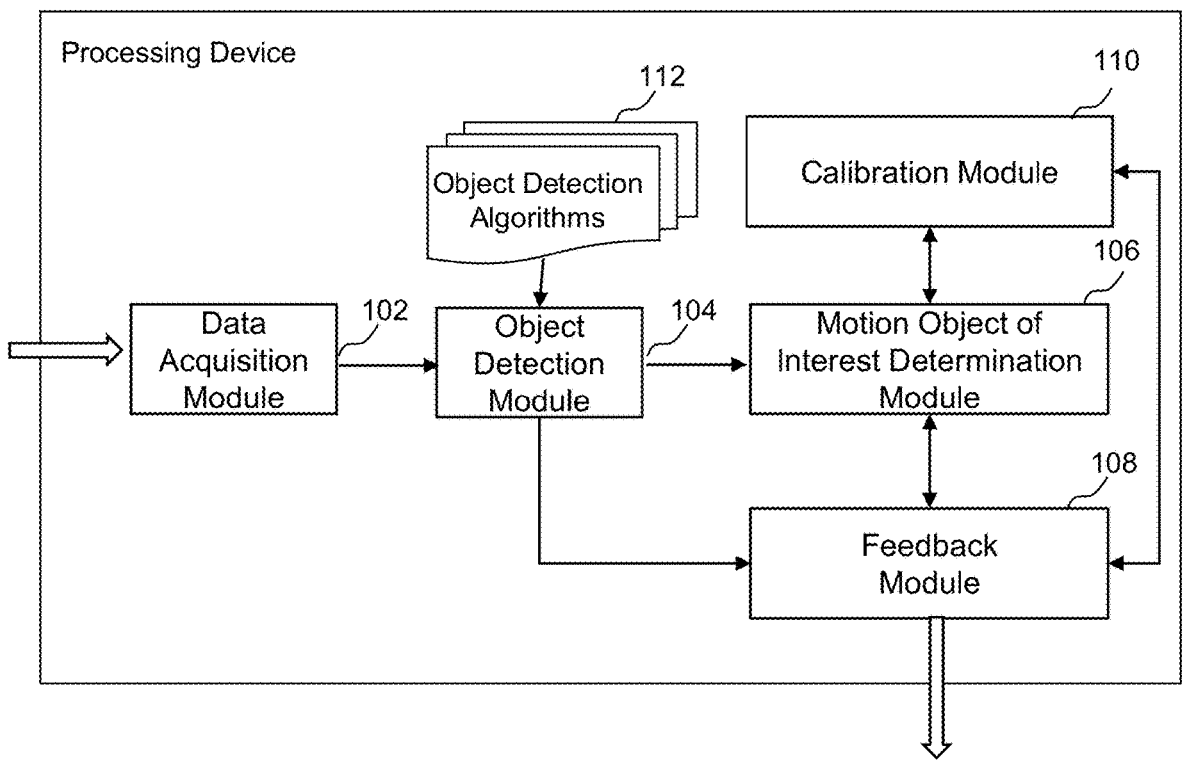
FIG. 1 is a schematic diagram illustrating a processing device according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation, various components of the stated system, functions of the related elements of structure, and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implemented according to some embodiments of the present disclosure. It is to be expressly understood that the operations of the flowchart may be implemented not in order. Conversely, the operations may be implemented in an inverted order, or simultaneously. Moreover, one or more other operations may be added to the flowcharts. One or more operations may be removed from the flowcharts.

The terms "passenger," "requester," "requestor," "service requester," "service requestor," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity or a tool that may provide a service or facilitate the providing of the service. The term "user" in the present disclosure is used to refer to an individual, an entity or a tool that may request a service, order a service, provide a service, or facilitate the providing of the service. In the present disclosure, terms "requester" and "requester terminal" may be used interchangeably, and terms "provider" and "provider terminal" may be used interchangeably.

The terms "request," "service," "service request," and "order" in the present disclosure are used interchangeably to refer to a request that may be initiated by a passenger, a requester, a service requester, a customer, a driver, a provider, a service provider, a supplier, or the like, or any combination thereof. Depending on the context, the service request may be accepted by anyone of a passenger, a requester, a service requester, a customer, a driver, a provider, a service provider, or a supplier. In some embodiments, the service request is accepted by a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for video surveillance. The system may obtain a video including a plurality of frames collected by a visual sensor. The system may detect one or more objects in at least a portion of the plurality of frames. The system may determine a first detection result associated with the one or more objects with a trained self-learning model. The trained self-learning model may be provided based on a plurality of training samples collected by the visual sensor itself. The pretrained self-learning model may learn from the historical videos around an environment, analyze and learn real-time videos captured at the environment and/or anticipate a future video of the environment. Accordingly, using the self-learning technique, a portion of the plurality of training samples may need to be labeled, which may reduce the computation and cost. Using the plurality of training samples obtained by the visual sensor to obtain the trained self-learning model and using the trained self-learning model to process a video collected by the visual sensor may improve the accuracy of the predicted result of a detected object using the trained self-learning model.

In some embodiments, the system may analyze behavior features of an object detected from a video to further predict a category of the detected object, which may further improve the accuracy of the predicted result of the detected object. In some embodiments, the system may automatically calibrate the visual sensor based on the predicted result, which may improve the accuracy of the calibration of the visual sensor and reduce the cost for calibration. For example, the system may determine an estimated value of a characteristic (e.g., size) of a detected object represented in a frame of a video. The system may determine a calibration model of the visual sensor based on the estimated value of the characteristic and a reference value (or known value) of the characteristic.

For illustration purposes, the disclosure describes systems and methods for a video surveillance system. It should be noted that the video surveillance system 700 described below is merely provided for illustration purposes, and not intended to limit the scope of the present disclosure.

FIG. 1 is a schematic diagram illustrating an exemplary processing device according to some embodiments of the present disclosure. As shown, the processing device 100 (e.g., the processing device 740) may include a data acquisition module 102, an object detection module 104, a motion object of interest determination module 106, a feedback module 108, and a calibration module 110. In some embodiments, the data acquisition module 102, the object detection module 104, the motion object of interest determination module 106, the feedback module 108, and the calibration module 110 may be connected to and/or communicate with each other via a wireless connection (e.g., a network), a wired connection, or a combination thereof.

The data acquisition module 102 may obtain data and/or information for object detection. In some embodiments, the data acquisition module 102 may obtain one or more videos collected by a visual sensor. In some embodiments, the data acquisition module 102 may obtain one or more models and/or algorithms for object detection. For example, the data acquisition module 102 may an object detection model and/or algorithm, a trained machine learning model for object detection, etc. As another example, the data acquisition module 102 may obtain a trained self-learning model for object detection.

In some embodiments, the data acquisition module 102 may further obtain one or more functional blocks and one or more parameters or constraints associated with a model (e.g., a trained self-learning model for object detection, also referred to as a preliminary video surveillance model). The one or more functional blocks may be integrated into or implemented by the preliminary video surveillance model as "background knowledge". The one or more parameters or constraints may be integrated into or implemented by the preliminary video surveillance model as "general property of the world". The one or more function blocks may each be a trained sub-model corresponding to a certain function. For example, an object recognition function block may be pretrained to recognize certain type(s) of objects in the videos, including but not limited to a wheel of a vehicle, a license plate of a vehicle, a human face, a standing human, a head of a human, a shoulder of a human, etc. It should be noted that the preliminary video surveillance model may be trained without the one or more functional blocks, however the training may last much longer.

The object detection module 104 may detect one or more objects from a video collected by a visual sensor. In some embodiments, the object detection module 104 may detect and/or identify an object (e.g., one or more motion objects) from the video using one or more object detection algorithms 112 acquired by the data acquisition module 102. In some embodiments, the object detection module 104 may detect an object in a frame of the video using a trained machine learning model for object detection. The trained machine learning model for object detection may be constructed based on a deep learning model. In some embodiments, the object detection module 104 may mark each of the one or more objects detected from the video in each frame of the video using, such as a bounding box.

The motion object of interest determination module 106 may select a target moving object of interest from the one or more objects. As used herein, a moving object of interest may refer to an object of a certain category in a video, for example, a vehicle or a portion thereof, (e.g., a wheel of a vehicle, a license plate of a vehicle), a human or a portion thereof (e.g., the human face, the head of a human, the shoulder of a human, etc.) or a moving object including an anomaly regarding the motion, state, and/or manner of the moving object. The anomaly regarding the motion, state, and/or manner of the moving object may also be referred to as an anomaly regarding a behavior of the moving object. In some embodiments, the motion object of interest determination module 106 may determine a first detection result associated with one or more moving objects with a trained self-learning model. In some embodiments, the first detection result may include one or more moving objects of interest selected from the one or more objects.

In some embodiments, motion object of interest determination module 106 may determine the target moving object of interest based on the first detection result and a second detection result. In some embodiments, the first detection result may include a probability that each of the one or more objects is a moving object of interest. The motion object of interest determination module 106 may designate one of the one or more objects whose probability is maximum among the one or more objects or exceeds a threshold as the target moving object of interest.

In some embodiments, the target moving object of interest may be determined based on the first detection result and a second detection result. The second detection result may be determined with a behavior analyzing of the objects. As used herein, the behavior analyzing may refer to determine whether a behavior or motion of an object is normal or abnormal. A behavior of an object may be defined by one or more actions of the object, a voice of the object, etc. The behavior analyzing of an object may be performed by analyzing moving characteristics of the object. In some embodiments, the first detection result may include one or more first candidate moving objects of interest, and the second detection result may include one or more second candidate moving objects of interest. The motion object of interest determination module 106 may designate the same candidate moving object of interest from the one or more first candidate moving objects of interest and the one or more second candidate moving objects of interest as the target moving object of interest.

In some embodiments, the motion object of interest determination module 106 may detect motions of the one or more recognized objects based on at least two video frames of the captured videos. For example, the smart motion detection system may compare the locations, shapes, sizes of the objects in the at least two video frames to determine the motions of the one or more recognized objects. Merely by way of example, the motions of the objects may include but not limited to moving from side to side, jumping upwards, squatting down, spinning, etc. and be depicted by various parameters including a distance, a speed, a direction, a change of shape or size, an intensity, and/or a moving trace. The motion object of interest determination module 106 may be configured to analyzing motions of the objects in the captured videos. In particular, the motion object of interest determination module 106 may determine whether a motion of an object is normal or abnormal. In some embodiments, a motion of an object may be determined as abnormal if it is associated with an unexpected accident, such as, a vandal, an explosion, a crush of building, a theft, etc. Alternatively, a motion of an object may be determined as abnormal if the object doesn't normally perform it. For example, the motion object of interest determination module 106 may acquire motions or actions that an object or a certain type of object normally performs (also referred to as normal motions or normal actions). If it is noticed in the captured videos that an object or an object of the certain type does not perform the "normal" motion or action after a pre-determined period, or performs a motion different from the "normal" motion (usually opposite), the motion object of interest determination module 106 may determine that the motion of the object is abnormal. In some embodiments, the "normal" motion may be detected and concluded by the motion object of interest determination module 106 while the smart motion detection system is continuously monitoring the environment. Alternatively, the "normal" motion may be obtained from an external resource (e.g., a database) or an observer.

The feedback module 108 may generate a feedback relating to the detection of the target moving object of interest. In some embodiments, the feedback module 108 may generate candidate feedbacks each of which relates to the detection of a moving object, and determine target feedback from the candidate feedbacks based on at least one of the first detection result and/or the second detection result. In some embodiments, the feedback module 108 may further verify whether the target feedback is a false feedback. In some embodiments, the feedback module 108 may transmit the feedback or the target feedback relating to the detection of the target moving object of interest to a terminal.

The feedback module 108 may be configured to filter out false alarms. The false alarms may refer to alarms generated by the alarm generation module while the motions happened in the videos do not required to be alarmed (harmless) or the motions are normal. The feedback module 108 may collect the alarms that it believes as false alarms and output them to an observer (e.g., the householder) via a communication module to be further verified. If the observer confirms that the alarm is correct, the alarm generation module may generate a similar alarm when a same or similar motion of a same or similar object in the videos is noticed in future. If the observer confirms that the alarm is incorrect, the feedback module 108 may determine the alarm as false alarm and filter out the alarm when a same or similar motion of a same or similar object in the videos is noticed in future. In some embodiments, the feedback module 108 may not need the observer to verify the alarm but may self-confirm that the alarm is a false alarm when the "abnormal" motion (i.e., a motion that the smart motion detection system primarily believes to be abnormal) that caused the alarm is repeatedly noticed.

The calibration module 110 may determine a calibration model of the visual sensor based on the target moving object of interest. In some embodiments, the calibration module 110 may determine the parameters of the visual sensor based on characteristics of the at least a portion of the target moving object of interest. Specially, the calibration module 110 may determine an estimated value of a characteristic of at least a portion of the target moving object of interest presented in a frame and denoted by a 2D coordinate system applied to a frame of a video collected by the visual sensor. The calibration module 110 may determine a reference value of the characteristic of the at least a portion of the target moving object of interest denoted by a 3D coordinate system applied to the visual sensor. In some embodiments, the calibration module 110 may further determine the calibration model based on the estimated value and the reference value. In some embodiments, the calibration module 110 may recognize objects with known sizes and shapes in the videos.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 2:
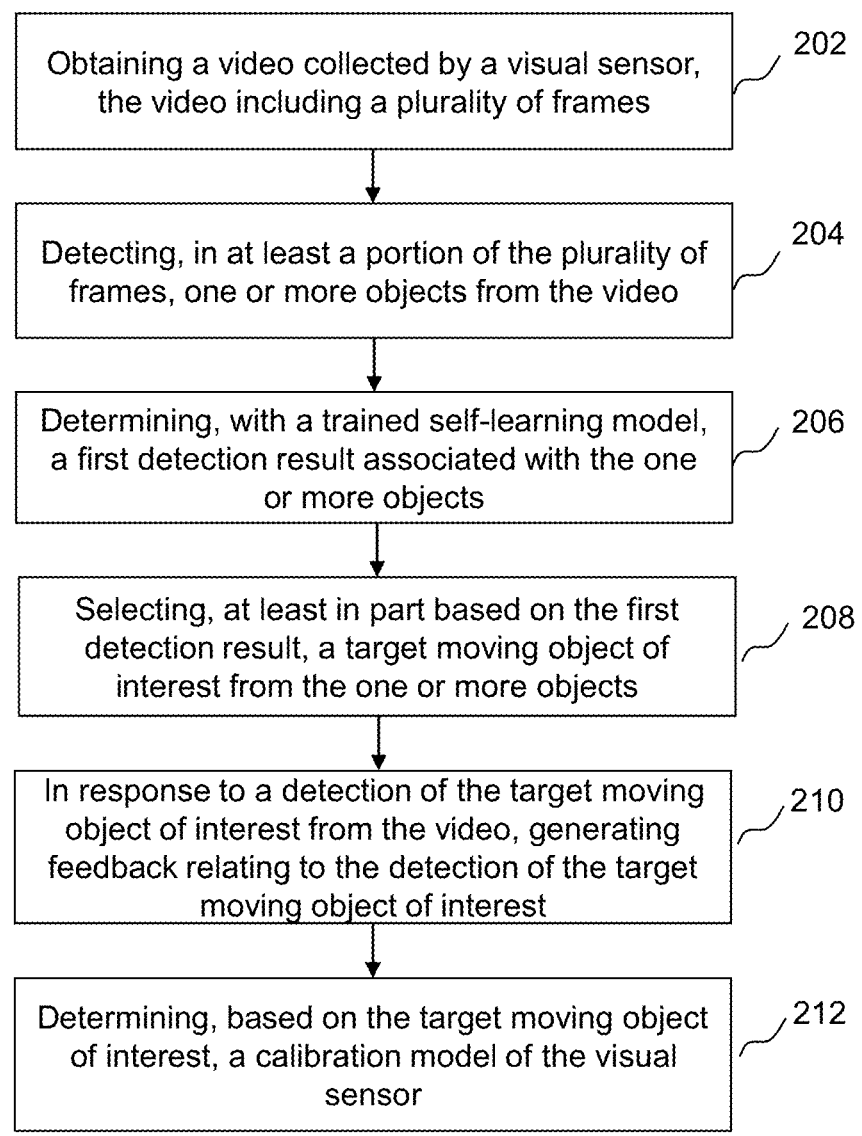
FIG. 2 is a flowchart illustrating an exemplary process for video surveillance according to some embodiments of the present disclosure.
Figure 8:
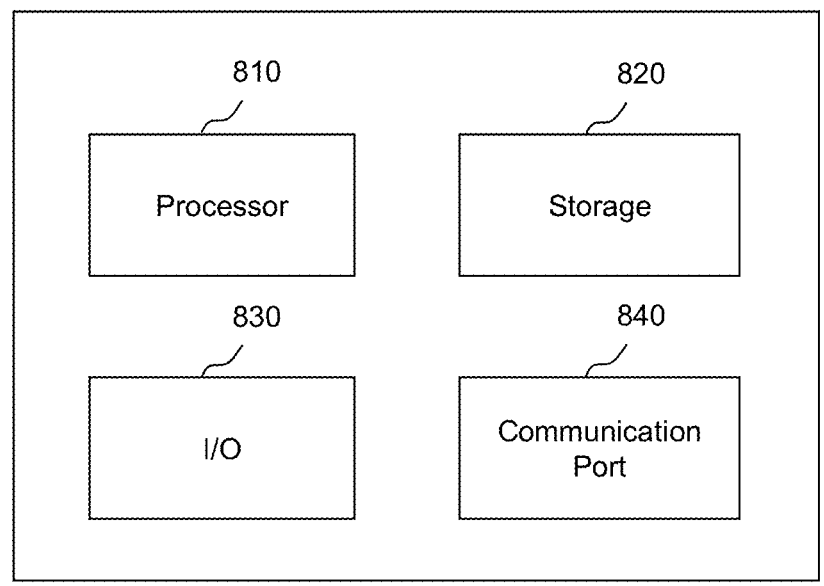
FIG. 8 is a schematic diagram illustrating exemplary hardware and/or software components of a computing device on which the processing engine may be implemented according to some embodiments of the present disclosure.
Figure 9:
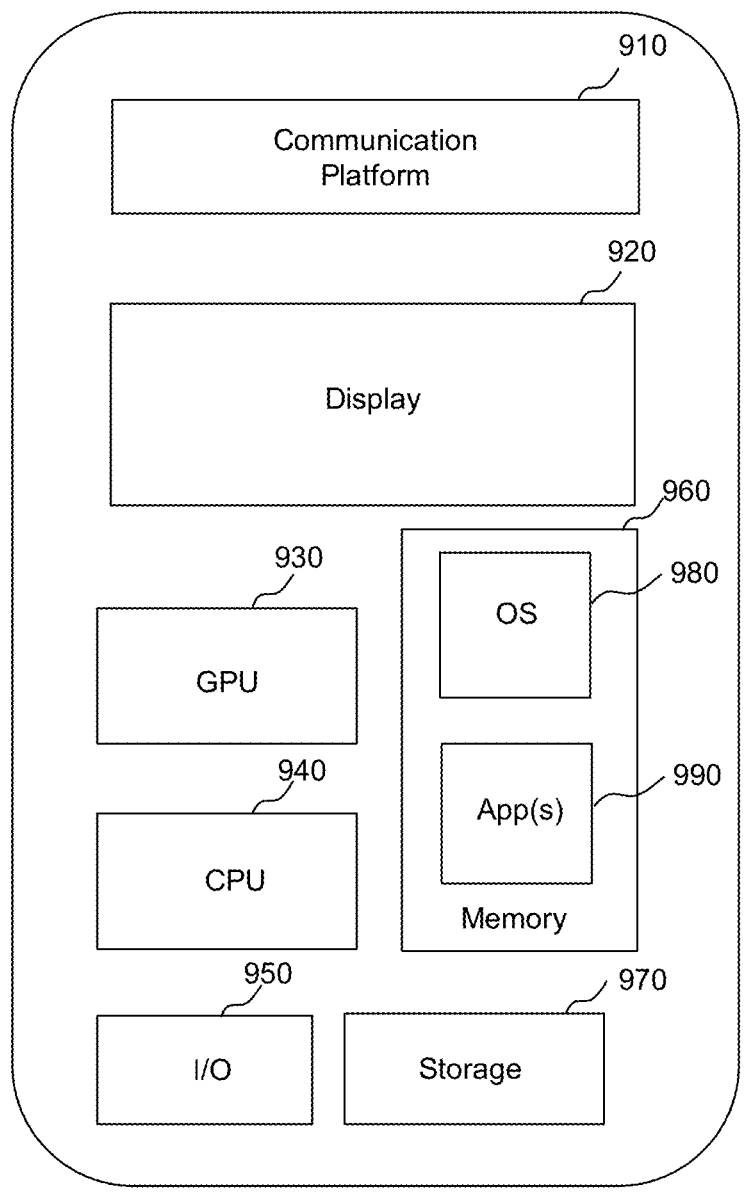
FIG. 9 is a schematic diagram illustrating exemplary hardware and/or software components of a mobile device on which the terminal(s) may be implemented according to some embodiments of the present disclosure.

FIG. 2 is a flowchart illustrating an exemplary process 200 for video surveillance according to some embodiments of the present disclosure. In some embodiments, one or more operations of process 200 illustrated in FIG. 2 may be implemented in the video surveillance system 700 illustrated in FIG. 7. For example, the process 200 illustrated in FIG. 2 may be stored in the storage 780 in the form of instructions, and invoked and/or executed by the processing device 740 (e.g., the processor 810 of the computing device 800 as illustrated in FIG. 8, the GPU 930 or CPU 940 of the mobile device 900 as illustrated in FIG. 9).

In 202, the processing device 100 may obtain a video collected by a visual sensor. Operation 202 may be performed by the data acquisition module 102. The video may include a plurality of frames. At least a portion of the plurality of frames may include one or more objects. The one or more objects may be static objects (e.g., treasures in a museum) or mobile or moving objects (e.g., products on the assembly line of an unmanned factory), or any combination thereof. As used herein, the term "video" may refer to motion pictures represented in analog and/or digital form. For example, a video may include television, movies, image frame from a camera or other observer, computer-generated image frames, or the like, or a combination thereof. A frame may refer to a particular image or other discrete units within a video. The visual sensor may refer to an apparatus for visual recording. For example, the visual sensor may include a color camera, a digital video camera, a camera, a camcorder, a PC camera, a webcam, an infrared (IR) camera, a low-light video camera, a thermal video camera, a CCTV camera, a pan, a tilt, a zoom (PTZ) camera, a video sensing device, or the like, or a combination thereof. The visual sensor may reside within the video surveillance system 700 or locate outside the video surveillance system 700. For example, the video surveillance system 700 may include a camera. The visual sensor and a processor (e.g., the processing device 740) may be installed within the camera. As another example, the video surveillance system 700 may include the processing device 100 (e.g., the processing device 740 as described in FIG. 7), such as a sever. The visual sensor and the processing device (e.g., the processing device 740 as described in FIG. 7) may be physically separated from each other. The processing device may obtain the video from the processing device (e.g., the processing device 740) via a network (e.g., the network 750). In some embodiments, the video may be obtained from the visual sensor 720, the storage device 780, the terminals 760, or any other external storage device. For example, the processing device 100 may obtain the video from the visual sensor 720 directly.

In 204, the processing device 100 may detect one or more objects in at least a portion of the plurality of frames. Operation 204 may be performed by the object detection module 104. The one or more objects detected in the at least a portion of the plurality of frames may be static objects (e.g., treasures in a museum) or moving objects (e.g., products on the assembly line of an unmanned factory), or any combination thereof. For example, a static object may include a tree, a cloud, grass, etc. A moving object may include a vehicle, a pedestrian, an animal, etc. In some embodiments, the processing device 100 may detect and/or identify an object in a frame using one or more object detection algorithms 112. Exemplary object detection algorithms may include an inter-frame difference algorithm, a background difference algorithm, an optical flow algorithm, or the like, or a combination thereof. For example, the background difference algorithm may include a temporal difference algorithm, an average filtering algorithm, a W4 algorithm, a Gaussian mixture model algorithm, etc. In some embodiments, an object may be detected in a frame of the video using a trained machine learning model for object detection. The trained machine learning model for object detection may be constructed based on a deep learning model. For example, the deep learning model may include a deformable parts model (DPM), an overheat network, a spatial pyramid pooling network (SPPNet), a convolutional neural network (CNN), a regions with CNN (R-CNN), a fully convolutional network (FCN), a you only look once (YOLO) network, or the like, or any combination thereof. As used herein, the detection of an object may include determining parameters (e.g., locations, sizes and/or shapes) of the object and/or describing the object on the captured video or each of the at least a portion of the plurality of frames using, e.g., a rectangular block (e.g., a bounding box) around the boundaries of the object based on the parameters and/or a number for marking the object. In some embodiments, the detection of the object may include determining and/or identify the same object in different frames. In some embodiments, the detection of an object may further include determining the category of the object based on the determined parameters. For example, the processing device 100 may recognize a first section of the one or more objects as a human and a second section of the one or more objects as a car. As another example, the processing device 100 may recognize a third section of the one or more objects on the captured videos as a face of a human and the fourth section as a wheel of a car. In some embodiments, the processing device 100 may determine identification information (e.g., the name, the gender, the age, the ID number) of a recognized person in the environment by searching the face of the person in a database. In some embodiments, the processing device 100 may determine identification information (e.g., the brand, the model number, the name of the owner) of a recognized car in the environment by searching the plate number of the car in a database.

In 206, the processing device 100 may determine a first detection result associated with the one or more objects with a trained self-learning model. Operation 206 may be performed by the object detection module 104. In some embodiments, the first detection result may include one or more moving objects of interest selected from the one or more objects detected in operation 204. As used herein, an object refers to digital and/or analog representation of actual items/beings in digital and/or analog videos and/or images. As used herein, a moving object of interest may refer to an object of a certain category in a video, for example, a vehicle or a portion thereof, (e.g., a wheel of a vehicle, a license plate of a vehicle), a human or a portion thereof (e.g., the human face, the head of a human, the shoulder of a human, etc.) or a moving object including an anomaly regarding the motion, state, and/or manner of the moving object. The anomaly regarding the motion, state, and/or manner of the moving object may also be referred to as an anomaly regarding a behavior of the moving object. For example, if a moving object performs an action, while one or more moving objects of the same category have not performed the action for a pre-determined past period or performed a different (usually opposite) action, the anomaly regarding the behavior of the moving object may exist. As another example, if a moving object does not perform an action after a pre-determined period, the anomaly regarding the behavior of the moving object may exist. In some embodiments, the first detection result may include a probability that at least one of the one or more objects detected in operation 204 is a moving object of interest.

In some embodiments, the processing device 100 may input/transfer the video with the one or more marked objects into the trained self-learning model. The trained self-learning model may output the first detection result by processing the video with the one or more marked objects. The trained self-learning model may be configured to predict and/or determine a category of objects and/or whether an anomaly regarding the behavior of the objects exists. In some embodiments, the trained self-learning model may include a knowledge base that is obtained by learning from historical image data (e.g., videos collected by the visual sensor). The trained self-learning model may predict and/or determine whether an object is a moving object of interest based on the knowledge base. The knowledge base may include regular patterns associated with the scene recorded in the historical image data. For example, the regular patterns associated with the scene may include habits of one or more objects appearing in the scene, natural laws, moving characteristics of the one or more objects appearing in the scene, inherent properties of the scene or an object appearing in the scene, etc. In some embodiments, the regular patterns may be learned depending on time, weather, location, etc. For example, the trained self-learning model may learn the regular patterns (e.g., moving characteristics) of different objects appearing in different scenes captured by the visual sensor at different times, different weather conditions, etc. For example, the scene may be determined as a general result e.g., indoor, outdoor, morning, afternoon, rainy, etc. Alternatively, the scene may be determined as a detailed result e.g., a gym at 9-10 am., a library at 3-4 pm., etc. The trained self-learning model may determine a moving object of interest or the anomaly regarding the behavior of the moving object by determining that the moving object violates or different from the regular patterns. For example, the trained self-learning model may learn from historical videos collected by a visual sensor installed in a prison that the prisoners in the prison sleep at 8 pm every night. However, if a prisoner in the prison walked around at 8 pm and didn't sleep until 9 pm on a certain day. The trained self-learning model may determine the behavior of the prison (regarding the time of sleeping) is abnormal. As another example, the trained self-learning model may learn from historical videos collected by a visual sensor installed in a house that a person in the house goes out at 8 am every day from Monday to Friday. However, if the person in the house did not go out on a certain day from Monday to Friday. The trained self-learning model may determine the behavior of the person is abnormal. As still another example, the trained self-learning model may learn, from historical videos collected by a visual sensor installed outside a house, appearance characteristics (e.g., height, hair length, dress habit, etc.) or behavior features of each of persons who in and out of the house. However, if a specific person who wants to get into the house did not satisfy the appearance characteristics (e.g., height, hair length, dress habit, etc.) or behavior features of each of persons learned by the trained self-learning model. The trained self-learning model may determine the behavior of the specific person is abnormal. More descriptions regarding the self-learning model may be found elsewhere in the present disclosure. See, e.g., FIG. 6 and relevant descriptions thereof.

In 208, the processing device 100 may select a target moving object of interest from the one or more objects at least in part based on the first detection result. Operation 208 may be performed by the motion object of interest determination module 106. The target moving object of interest may include at least one of a person, a vehicle, or an animal whose motion includes an anomaly.

In some embodiments, the target moving object of interest may be determined merely by the trained self-learning model. For example, the first detection result may include a probability that each of the one or more objects is a moving object of interest. The processing device 740 may designate one of the one or more objects whose probability is maximum among the one or more objects or exceeds a threshold as the target moving object of interest.

In some embodiments, the target moving object of interest may be determined based on the first detection result and a second detection result. The second detection result may be determined with a behavior analyzing of the objects. As used herein, the behavior analyzing may refer to determine whether a behavior or motion of an object is normal or abnormal. A behavior of an object may be defined by one or more actions of the object, a voice of the object, etc. The behavior analyzing of an object may be performed by analyzing moving characteristics of the object. In some embodiments, the first detection result may include one or more first candidate moving objects of interest, and the second detection result may include one or more second candidate moving objects of interest. The motion object of interest determination module 106 may designate the same candidate moving object of interest from the one or more first candidate moving objects of interest and the one or more second candidate moving objects of interest as the target moving object of interest.

In some embodiments, the first detection result may include a first probability that each of the one or more objects is a moving object of interest, and the second detection result may include a second probability that each of the one or more objects is a moving object of interest. The motion object of interest determination module 106 may designate a moving object having a first probability exceeding a first threshold and a second probability exceeding a second threshold as the target moving object of interest. More descriptions regarding the behavior analyzing of the objects may be found elsewhere in the present disclosure. See, e.g., FIG. 4 and relevant descriptions thereof.

In 210, in response to a detection of the target moving object of interest from the video, the processing device 100 may generate feedback relating to the detection of the target moving object of interest. Operation 210 may be performed by the feedback module 108. In some embodiments, the feedback or the target feedback may include a notification indicating that a moving object or a moving object of interest exists. The notification may be in the form of text, voice, image, video, or the like, or any combination thereof. In some embodiments, the notification relating to the detection of the target moving object of interest may be an alarm to an observer of the video surveillance system 700 to notify an abnormal condition (i.e., anomaly). The abnormal condition may include a vandal, an explosion, a crush of building, a theft, an abnormal behavior, etc. For example, if the video surveillance system 700 is used to monitor the door of a house. The video surveillance system 700 may learn that the householder uses a key or the like to open the door every day. When it notices that an unknown person opens the door by bricking it with an axe, the feedback module 108 may generate an alarm to the householder. The alarm may include a sound, a light, a vibration, or the like, or any combination thereof by corresponding device(s) installed in the house.

In some embodiments, in response to a detection of each of at least a portion of the one or more objects (e.g., moving objects) from the video, the feedback module 108 may generate candidate feedbacks each of which relates to the detection of a moving object, and determine the target feedback from the candidate feedbacks based on at least one of the first detection result and/or the second detection result. For example, if a moving object determined based on the first detection result and/or the second detection result is a moving object of interest, the processing device 100 may designate the candidate feedback corresponding to the object as correct feedback or positive feedback (i.e., the target feedback). If a moving object determined based on the first detection result and/or the second detection result is not a moving object of interest, the feedback module 108 may designate the candidate feedback corresponding to the object as false feedback or negative feedback. The false feedback may include a false alarm. The false alarms may refer to alarms while the things happened in the videos do not require to be alarmed (harmless). For example, the feedback module 108 may generate a false alarm when it notices a cat or a squirrel (which it may first believe as a criminal) jumped into a window of house. As another example, the feedback module 108 may generate a false alarm when it notices a shadow of a tree (which it may also first believe as a criminal) passing through a window of a house. In some embodiments, the feedback module 108 or an observer may further verify whether the target feedback is false feedback. For example, the feedback module 108 may collect the alarms that it believes as false alarms and output them to the observer (e.g., the householder) to be further verified. If the observer confirms that the alarm is correct, the feedback module 108 may generate a similar alarm when it notices the same thing in the videos in future. If the observer confirms that the alarm is incorrect, the feedback module 108 may determine the alarm as a false alarm and filter out the alarm when a similar thing is noticed in the videos in future. In some embodiments, the feedback module 108 may not need the observer to verify the alarm but may self-confirm that the alarm is a false alarm when the thing that caused the alarm is repeatedly noticed. For example, if the feedback module 108 generates an alarm every day at sunset when the shadow of the trees passing through a window of the house. The feedback module 108 may determine that the alarm is a false alarm (as even if it doesn't know the alarm is caused by the shadow of the trees which is harmless, it may believe that the criminal wouldn't come to the house at the same time every day), and filter out the alarm when a similar thing is noticed in the videos.

In some embodiments, the processing device 100 may transmit the feedback or the target feedback relating to the detection of the target moving object of interest to a terminal. The terminal may be a mobile device of a user or a police station. In some embodiments, the videos associated with the feedback or the target feedback may be transmitted to a user or a police station together with the feedback or the target feedback.

In 212, a calibration model of the visual sensor may be determined based on the target moving object of interest. Operation 212 may be performed by the calibration module 110. In some embodiments, the visual sensor may be or part of the visual sensor 720. The calibration model may describe a transform relationship between a 2D coordinate system applicated to a frame of a video (also referred to as an image coordinate system) and a 3D coordinate system applied to the visual sensor (also referred to as a sensor coordinate system). For example, the calibration model may be used to transform coordinates of a point in the 2D coordinate system to coordinates of the point in the 3D coordinate system. The calibration model may be defined by parameters (e.g., intrinsic parameters, extrinsic parameters, or distortion parameters) of the visual sensor. For example, the parameters associated with the visual sensors may include intrinsic matrix, focal length, location of a focal point, parameters of radial distortion, parameters of tangential distortion, rotation matrices, translation vectors, reprojection error, etc.

In some embodiments, the calibration module 110 may determine the parameters (i.e., the calibration model) of the visual sensor based on characteristics of the at least a portion of the target moving object of interest (e.g. face of a person). In some embodiments, the characteristics of the at least a portion of the target moving object of interest may include a physical size of at least a portion of the at least one of the target moving object of interest. The physical size may include height, a width, a length, a ratio of height to width, or the like, or any combination thereof. Specifically, the processing device 100 may determine an estimated value of a specific characteristic of at least a portion of the target moving object of interest presented in a frame and denoted by the 2D coordinate system. The processing device 100 may determine a reference value of the specific characteristic of the at least a portion of the target moving object of interest denoted by the 3D coordinate system. In some embodiments, the processing device 100 may further determine the calibration model based on the estimated value and the reference value. In some embodiments, the processing device 100 may obtain the reference value from one or more components of the video surveillance system 700 (e.g., the storage device 780, the visual sensor 720, and/or the terminal(s) 760). In some embodiments, a user may provide the reference value to the video surveillance system 700. The processing device 100 may access the storage device and retrieve the reference value. Additionally or alternatively, the processing device 100 may obtain the reference value (e.g., a length of a license plate of a car) from another source via the network 750. Another source may include a website, a database, a system, and/or any other source that may include the reference value. For example, the processing device 100 may obtain information relating to a vehicle (e.g., an average length of a sedan, an average width of wheels of a truck trailer) from an automotive supplier website. In some embodiments, the calibration module 110 may determine the estimated value of the at least a portion of the target moving object of interest in the 2D coordinate system applied to a frame of the video based on the frame of the video. For example, the estimated value corresponding to the height of the object may be a distance between coordinates of a point on the top of the object and coordinates of a point of the bottom of the object in the 2D coordinate system. The estimated value (e.g., 1.25 cm) may correspond to the reference value. For example, the estimated value corresponding to the height of an adult male may be associated with an average height of an adult male (e.g., 1.75 m). As another example, the estimated value corresponding to the length of a Honda SUV may be associated with a known length of the Honda SUV (e.g., 4.5 m).

In some embodiments, the processing device 100 may recognize objects with known sizes and shapes in the videos, e.g., the human body, human faces, etc. As the sizes of objects in the videos depend on both their actual sizes (which are known) and the parameters associated with visual sensors, the parameters associated with visual sensors may be obtained. In some embodiments, the visual sensor may be slightly moved during use, due to, for example, wind, animal, etc. The calibration model may recalibrate the parameters associated with visual sensors by comparing the video frames (not necessarily including the object with known sizes and shapes) before and after the movement. For example, the calibration model may compare the location, size, shape, orientation of the same object (even without knowing its actual size) in the video frames before and after the movement to recalibrated parameters associated with visual sensors. The movement of the visual sensors may be further determined based on the recalibrated parameters.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, an operation in process 200 may be divided into multiple operations. For example, process 200 may include an operation of filtering out false alarms. In some embodiments, process 200 may further include storing data (e.g., the detected objects, the first detection result, the second detection result, the target moving objects of interest, etc.) generated during operations 204-212. In some embodiments, operation 212 may be omitted.

Figure 3:
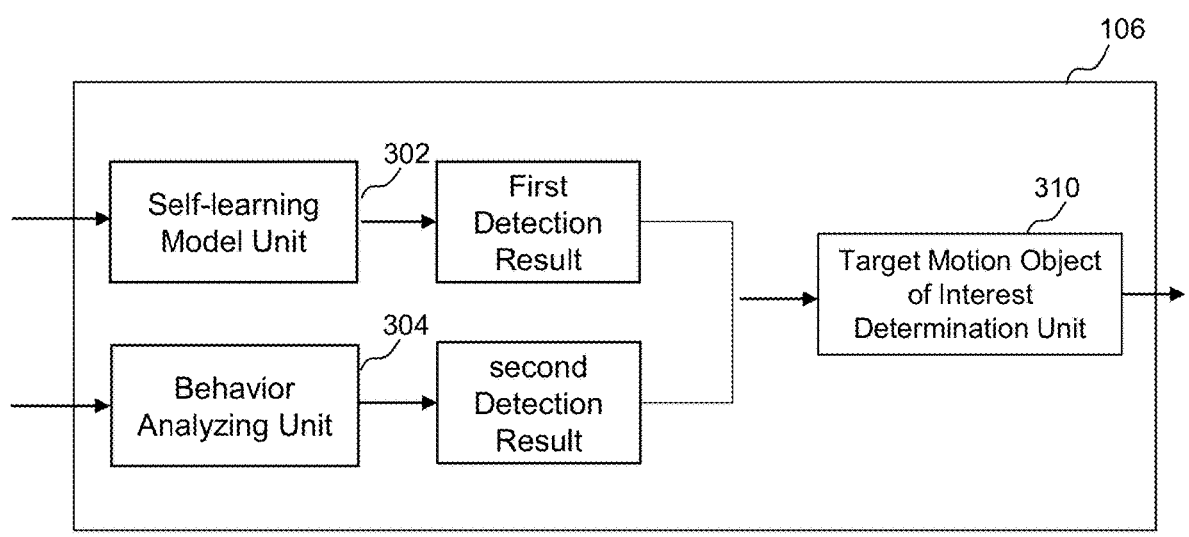
FIG. 3 is a block diagram illustrating exemplary hardware and/or software components of moving object of interest determination module according to some embodiments of the present disclosure.

FIG. 3 is a schematic diagram illustrating an exemplary moving object of interest determination module according to some embodiments of the present disclosure. As shown, the motion object of interest determination module 106 may include a self-learning model unit 302, a behavior analyzing unit 304, and a target object determination unit 306. In some embodiments, the self-learning model unit 302, the behavior analyzing unit 304, and the target object determination unit 306 may be connected to and/or communicate with each other via a wireless connection (e.g., a network), a wired connection, or a combination thereof.

The self-learning model unit 302 may obtain a trained self-learning model and determine a first detection result associated with one or more moving objects with the trained self-learning model. For example, the self-learning model unit 302 may input/transfer the video with the one or more marked objects into the trained self-learning model. The trained self-learning model may output the first detection result by processing the video with the one or more marked objects. In some embodiments, the self-learning model unit 302 may obtain the trained self-learning model using a plurality of training samples collected by a visual sensor to train a machine learning model (or a preliminary video surveillance model). The trained self-learning model may be configured to predict and/or determine a category of objects and/or whether an anomaly regarding the behavior of the objects exists. In some embodiments, the trained self-learning model may include a knowledge base that is obtained by learning from historical image data (e.g., videos collected by the visual sensor). The trained self-learning model may predict and/or determine whether an object is a moving object of interest based on the knowledge base. The knowledge base may include regular patterns associated with the scene recorded in the historical image data. For example, the regular patterns associated with the scene may include habits of one or more objects appearing in the scene, natural laws, moving characteristics of the one or more objects appearing in the scene, inherent properties of the scene or an object appearing in the scene, etc. In some embodiments, the regular patterns may be learned depending on time, weather, location, etc.

The behavior analyzing unit 304 may determine one or more behavior features associated with one or more objects based on at least a portion of a plurality of frames, and determine a second detection result associated with each of the one or more objects based on the one or more behavior features associated with each of the one or more objects. In some embodiments, the second detection result may include one or more second candidate moving objects of interest. In some embodiments, the second detection result may include a second probability that each of the one or more objects is a moving object of interest. The moving object of interest may refer to an object whose behavior or motion includes an anomaly. In some embodiments, the behavior analyzing unit 304 may determine the behavior features associated with an object based on a prior calibration model of a visual sensor that collects the plurality of frames.

In some embodiments, the behavior analyzing unit 304 may learn from the videos that an object or a certain type of object periodically perform a motion or an action. The period may be an hour, a day, a week, a month, a year, etc. In response to a notice that the object or an object of the certain type does not perform an action after a pre-determined period, or a different (usually opposite) action is performed by the object, the behavior analyzing module may determine that the behavior of the object is abnormal. For example, a behavior analyzing module may learn from the videos that the prisoners in a prison should sleep at 8 pm every night because they always sleep before 8 pm every night. However, the behavior analyzing module notices that the prisoners in the prison walked around at 8 pm and didn't sleep until 9 pm at a certain day. The behavior analyzing module may determine the behavior of the prison (regarding the time of sleeping) is abnormal. As a response, the behavior analyzing module may output the abnormal behavior to a monitor (e.g., a prison guard) via a communication module to be further verified. If the monitor confirms that behavior is abnormal, the behavior analyzing module may not change its knowledge that the prisoners should sleep at 8 pm. If the monitor confirms that the behavior is normal, the behavior analyzing module may develop a new knowledge that sleeping at 8 pm or 9 pm (or in between) are all normal behaviors. In some embodiments, the behavior analyzing module may not need the monitor to verify its determination of abnormal behavior but may self-confirm that the behavior is normal when the behavior is repeatedly noticed. For example, if the behavior analyzing module notices that the prisoners repeatedly sleep at 9 pm without being punished by the prison guard, the behavior analyzing module may develop a new knowledge that sleeping at 8 pm or 9 pm (or in between) are all normal behaviors and determine that the behaviors of the prisoners are normal when they sleep at 9 pm in future.

The target object determination unit 306 may determine the target moving object of interest from the one or more objects based on the first detection result and the second detection result. In some embodiments, as described in operation 208, the processing device 100 may designate the same candidate moving object of interest from the one or more first candidate moving objects of interest and the one or more second candidate moving objects of interest as the target moving object of interest. In some embodiments, as described in operation 208, the target moving object of interest determination unit 310 may designate a moving object having a first probability exceeding a first threshold and a second probability exceeding a second threshold as the target moving object of interest.

Figure 4:
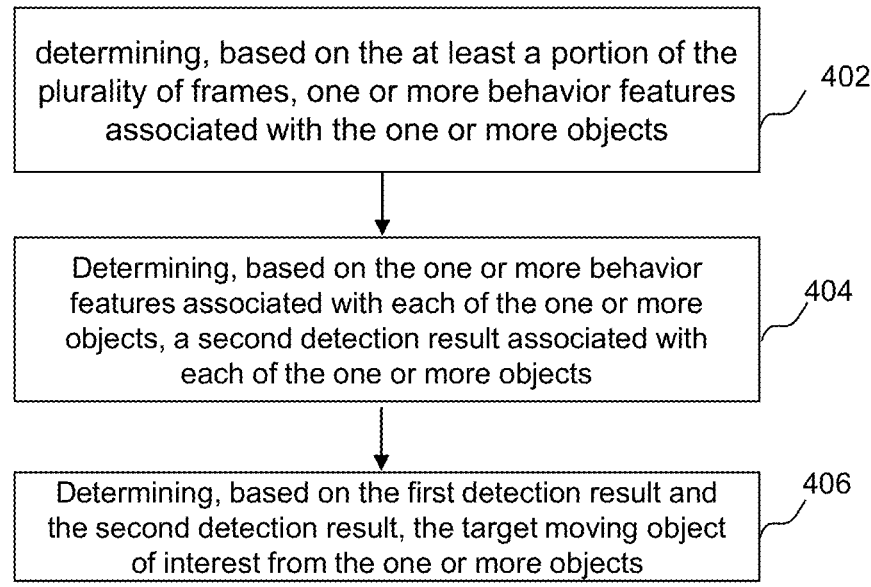
FIG. 4 is a flowchart illustrating an exemplary process for determining a moving object of interest according to some embodiments of the present disclosure.
Figure 5:
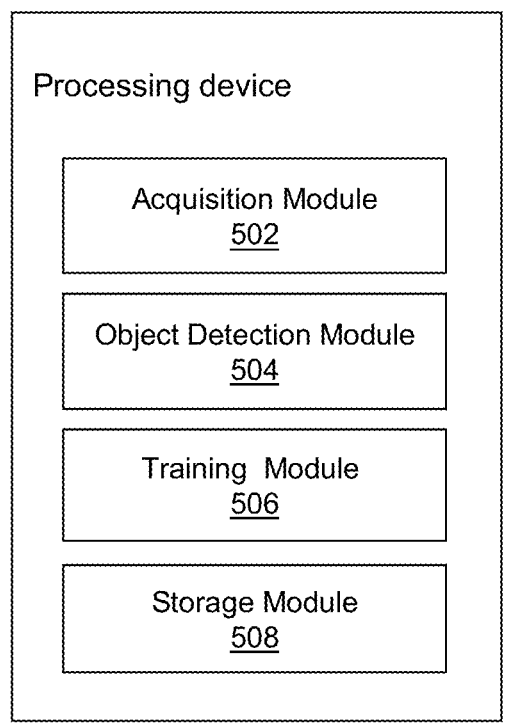
FIG. 5 is a block diagram illustrating exemplary hardware and/or software components of self-learning model unit according to some embodiments of the present disclosure.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, FIG. 4 is a flowchart illustrating an exemplary process for moving object detection according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 402, the processing device 100 may determine one or more behavior features associated with one or more objects based on at least a portion of a plurality of frames. Operation 402 may be performed by the behavior analyzing unit 304.

The one or more objects may be detected from the at least a portion of the plurality of frames as described in connection with operation 204 as illustrated in FIG. 2. As used herein, a behavior feature of an object may refer to a feature related to the motion or action of the object. Merely by way of example, the motions of the objects may include moving from side to side, jumping upwards, squatting down, spinning, etc. and be depicted by various parameters including a distance, a speed, a direction, a change of shape or size, an intensity, a moving trace, an acceleration, a trajectory movement amplitude, movement frequency, or voice information, or the like, or any combination thereof. In some embodiments, the processing device 100 may learn from the videos that an object or a certain type of object periodically performs a motion or an action. The period may be an hour, a day, a week, a month, a year, etc.

In some embodiments, the processing device 100 may determine the behavior features associated with an object based on a prior calibration model of a visual sensor that collects the plurality of frames. The prior calibration model may be determined in a prior calibration (e.g., the last calibration) of the visual sensor. For example, the prior calibration model may be determined based on one or more objects detected in the last motion detection performed at least in part the trained self-learning model. More descriptions regarding the prior calibration model (e.g., the calibration model as described in FIG. 2) of the visual sensor may be found elsewhere in the present disclosure. See, e.g., FIG. 2 and relevant descriptions thereof. The processing device 100 may determine a location of an object in each of the at least a portion of the plurality of frames where the object is detected from. The location of the object in a frame may be denoted as coordinates in a first coordinate system (i.e., an image coordinate system) applied to the frame. The plurality of frames may apply the same first coordinate system. The processing device 100 may determine a geographical position of the object in a second coordinate system (e.g., a geographical coordinate system, a world coordinate system, a sensor coordinate system, etc.). The processing device 100 may transform the coordinates of the object in the first coordinate system corresponding to each of the at least a portion of the plurality of frames into coordinates in the second coordinate system. The processing device 100 may determine the behavior features of the object based on the geographical positions of the object in the second coordinate system. For example, the processing device 100 may determine the moving trajectory by connecting the geographical coordinates of the object in the second coordinate system corresponding to each of the at least a portion of the plurality of frames. As another example, the geographical may determine the moving amplitude by comparing the geographical positions of the object corresponding to the at least two consecutive video frames.

In some embodiments, more accurate behavior features of an object may be obtained using the prior calibration model with improved accuracy. In some embodiments, the prior calibration model may be determined or calibrated in a prior calibration performed based on image data collected by the visual sensor as described in operation 212 in FIG. 2 before performing operation 402. For example, the prior calibration model may be determined based on estimated values of characteristics (e.g., size) of an object detected from the image data and known values of the characteristics (e.g., size) of the object. Therefore, the accuracy of the detection of the object may improve the accuracy of the prior calibration model determined and/or calibrated based on the detected object. By combining the self-learning model and behavior analysis, the accuracy for object detection may be improved, therefore improving the accuracy of the prior calibration model.

In 404, the processing device 100 may determine a second detection result associated with each of the one or more objects based on the one or more behavior features associated with each of the one or more objects. Operation 404 may be performed by the behavior analyzing unit 304. In some embodiments, the second detection result may include one or more second candidate moving objects of interest. In some embodiments, the second detection result may include a second probability that each of the one or more objects is a moving object of interest. The moving object of interest may refer to an object whose behavior or motion includes an anomaly.

In some embodiments, a motion or an action of an object may be determined as abnormal if it is associated with an unexpected accident, such as a vandal, an explosion, a crush of building, a theft, etc. Alternatively, a motion or an action of an object may be determined as abnormal if the object doesn't normally perform it. In some embodiments, the behavior analyzing unit 304 may acquire motions or actions that an object or a certain type of objects normally perform (also referred to as normal motions or normal actions). In response to a notice that the object or an object of the certain type does not perform the "normal" motion or action after a pre-determined period, or performs a motion different from the "normal" motion (usually opposite), the behavior analyzing unit 304 may determine that the behavior of the object is abnormal. The processing device 100 may further determine that the object may be a second candidate moving object of interest in the second detection result. In some embodiments, the processing device 100 may output the abnormal behavior to an observer to be further verified. If the observer confirms that behavior is abnormal, the processing device 100 may determine that the object may be a second candidate moving object of interest in the second detection result. If the observer confirms that the behavior is normal, the processing device 100 may determine that the object is not a second candidate moving object of interest in the second detection result. For example, the processing device 100 may learn from the videos that the prisoners in a prison should sleep at 8 pm every night because they always sleep before 8 pm every night. However, the behavior analyzing unit 304 notices that the prisoners in the prison walked around at 8 pm and didn't sleep until 9 pm on a certain day. The behavior analyzing unit 304 may determine the behavior of the prisoners (regarding the time of sleeping) is abnormal. The processing device 100 may further determine that the prisoners are second candidate moving objects of interest in the second detection result. As a response, the behavior analyzing unit 304 may output the abnormal behavior of the prisoners to an observer (e.g., a prison guard) to be further verified. If the observer confirms that behavior of the prisoners is abnormal, the behavior analyzing unit 304 may not change its knowledge that the prisoners should sleep at 8 pm and determine that the prisoners may be second candidate moving objects of interest. If the observer confirms that the behavior of the prisoners is normal, the behavior analyzing unit 304 may develop a new knowledge that sleeping at 8 pm or 9 pm (or in between) are all normal behaviors and determine that the prisoners are not second candidate moving objects of interest. In some embodiments, behavior analyzing unit 304 may not need the observer to verify its determination of abnormal behavior but may self-confirm that the behavior is normal when the behavior is repeatedly noticed. For example, if the behavior analyzing unit 304 notices that the prisoners repeatedly sleep at 9 pm without being punished by the prison guard, the behavior analyzing unit 304 may develop a new knowledge that sleeping at 8 pm or 9 pm (or in between) are all normal behaviors and determine that the behaviors of the prisoners are normal when they sleep at 9 pm in future. In some embodiments, the "normal" motion may be detected and concluded by the behavior analyzing unit 304 while the video surveillance system 700 is continuously monitoring the environment. Alternatively, the "normal" motion may be obtained from an external resource (e.g., a database) or an observer.

In 406, the target moving object of interest may be determined from the one or more objects based on the first detection result and the second detection result. Operation 406 may be performed by the target object determination unit 306.

The first detection result may be obtained as described in connection with operation 206 illustrated in FIG. 2. For example, the processing device 100 may input/transfer the video with the one or more marked objects into the trained self-learning model. The trained self-learning model may output the first detection result by processing the video with the one or more marked objects. In some embodiments, as described in operation 208, the processing device 100 may designate the same candidate moving object of interest from the one or more first candidate moving objects of interest and the one or more second candidate moving objects of interest as the target moving object of interest. In some embodiments, as described in operation 208, the target moving object of interest determination unit 310 may designate a moving object having a first probability exceeding a first threshold and a second probability exceeding a second threshold as the target moving object of interest.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. In some embodiments, an operation in process 400 may be divided into multiple operations. For example, process 200 may include an operation of detecting action or motion of the one or more objects. In some embodiments, process 200 may further include storing data (e.g., the behavior features, the second detection result, the target moving objects of interest, etc.) generated during operations 402-406.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, one or more other optional operations (e.g., a storing operation) may be added elsewhere in the process 400. In the storing operation, the processing device 100 may store information and/or data (e.g., behavior features) associated with a moving object in a storage device (e.g., the storage device 780) disclosed elsewhere in the present disclosure. As another example, process 400 may further include obtaining a calibration model of the visual sensor.

FIG. 5 is a schematic diagram illustrating an exemplary processing device according to some embodiments of the present disclosure. As shown, the processing device 500 (e.g., the processing device 740) may include an acquisition module 502, an object detection module 504, a training module 506, and a storage module 508. In some embodiments, the acquisition module 502, the object detection module 504, the training module 506, and the storage module 508 may be connected to and/or communicate with each other via a wireless connection (e.g., a network), a wired connection, or a combination thereof. In some embodiments, the processing device 100 and the processing device 500 may be the same processing device. In some embodiments, the processing device 100 and the processing device 500 may be different processing devices.

The acquisition module 502 may obtain a plurality of training samples each of which includes a historical video collected by a visual sensor. In some embodiments, the plurality of training samples may be collected by the visual sensor in a historical period, e.g., an hour, a day, a week, a month, etc. In some embodiments, the historical video may be collected by the visual sensor via recording a scene, for example, related to indoor and/or outdoor environment in a sub-period, e.g., an hour, a day, a week, a month, etc. The historical video may include a plurality of video frames or pictures. At least some of the video frames may include one or more objects. The one or more objects may be static objects (e.g., treasures in a museum) or mobile objects (e.g., products on the assembly line of an unmanned factory, vehicles, pedestrians), or any combination thereof.

The object detection module 504 may detect one or more subjects from the historical video for each of the plurality of training samples. In some embodiments, the object detection module 504 may detect the one or more subjects from the historical video using an object detection algorithm and/or a trained machine learning model for object detection as similar to the object detection module 104. In some embodiments, the one or more subjects detected from the historical video may be marked by a bounding box in each of at least a portion of frames in the historical video. The bounding box may refer to a box enclosing at least a portion of the detected subject in a frame. The bounding box may be of any shape and/or size. For example, the bounding box may have the shape of a square, a rectangle, a triangle, a polygon, a circle, an ellipse, an irregular shape, or the like. The same subject presented in different frames may be designated with the same number or marked by bounding boxes with same colors.

The training module 506 may train a self-learning model based on the plurality of training samples to obtain the trained self-learning model. The training module 506 may train the self-learning model (also referred to as a self-taught learning model) based on the plurality of training samples each of which with the one or more marked subjects. The each of the plurality of training samples with the one or more marked subjects may serve as the input of the self-learning model in the training process. The training module 506 may learn information associated with the one or more subjects detected from each of the first portion of the plurality of training samples. The training module 506 may train the self-learning model based on the information associated with the one or more marked and/or detected subjects. The information associated with a detected subject may include time information when the detected subject was recorded by the historical video, spatial information associated with the detected subject, weather information when the detected subject was recorded by the historical video; or motion information of the detected motion subject, etc.

The storage module 508 may store information. The information may include programs, software, algorithms, data, text, number, images and some other information. For example, the information may include training samples, a trained machine learning model, an initial machine learning model, a training algorithm, etc.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure. For example, the storage module 508 may be omitted. As another example, the processing device 500 may include other modules as described in the processing device 100.

Figure 6:
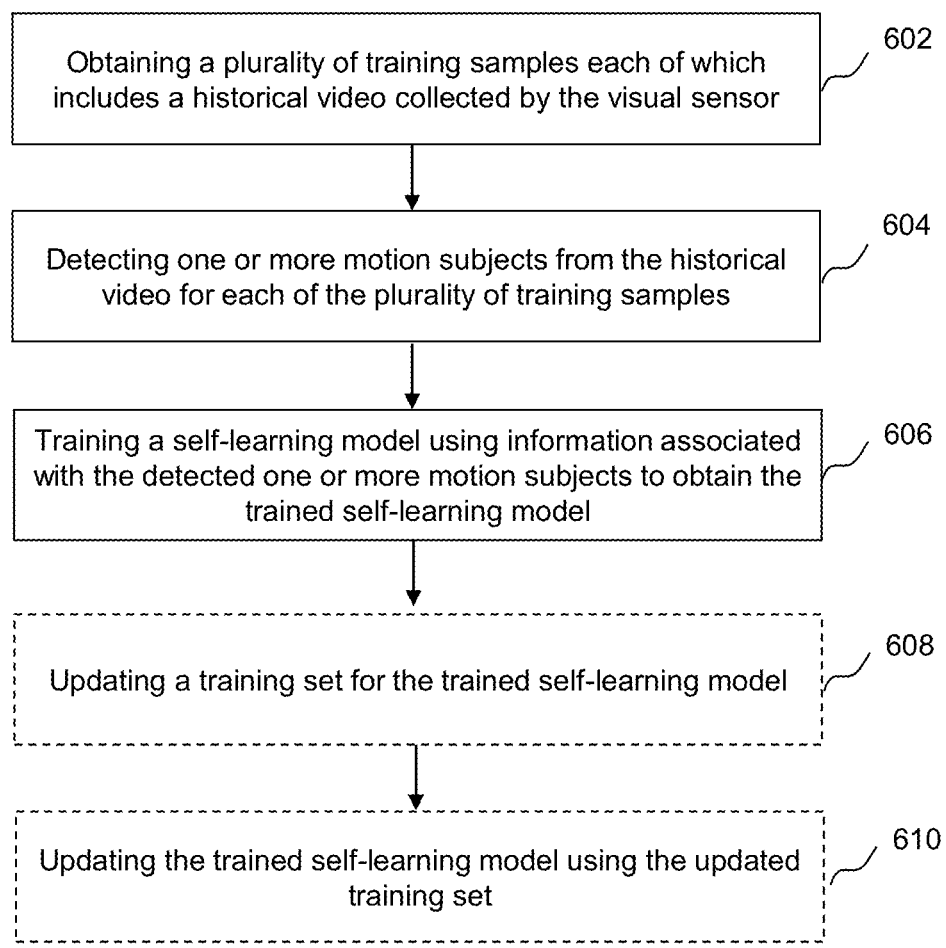
FIG. 6 is a flowchart illustrating an exemplary process for training a self-learning model according to some embodiments of the present disclosure.

FIG. 6 is a flowchart illustrating an exemplary process for training a self-learning model according to some embodiments of the present disclosure. In some embodiments, process 600 may be executed by the video surveillance system 100. For example, the process 600 may be implemented as a set of instructions (e.g., an application) stored in a storage device (e.g., the storage device 780, the storage 820, the storage 970). In some embodiments, the processing device 740 (e.g., the processor of the computing device 800, the CPU 940 of the mobile device 900, and/or one or more modules illustrated in FIG. 5) may execute the set of instruction and any accordingly be directed to perform the process 600. In some embodiments, the training of the self-learning model for object detection may be performed by a processor (e.g., the processing device 100) installed in a visual sensor based on image data collected by the visual sensor. The application of the trained self-learning model for object detection may be also performed by the processor (e.g., the processing device 100) installed in the visual sensor. In some embodiments, the training of the self-learning model for object detection may be performed by a server (e.g., the processing device 740) separated from a visual sensor based on image data collected by the visual sensor. In some embodiments, one or more operations of the process 600 may be performed to achieve at least part of operation 206 as described in connection with FIG. 2. For illustration purposes, an implementation of the process 600 for training a self-learning model of the video surveillance system is described hereinafter.

In 602, the processing device 100 (e.g., the acquisition module 502) may obtain a plurality of training samples each of which includes a historical video collected by a visual sensor. In some embodiments, the plurality of training samples may be collected by the visual sensor in a historical period, e.g., an hour, a day, a week, a month, etc. In some embodiments, the historical video may be collected by the visual sensor via recording a scene, for example, related to indoor and/or outdoor environment in a sub-period, e.g., an hour, a day, a week, a month, etc. The historical video may include a plurality of video frames or pictures. At least some of the video frames may include one or more objects. The one or more objects may be static objects (e.g., treasures in a museum) or mobile objects (e.g., products on the assembly line of an unmanned factory, vehicles, pedestrians), or any combination thereof. Each of the plurality of frames may correspond to a timestamp used to record when the frame is collected. In some embodiments, the scene recorded by the visual sensor may include background and foreground. In some embodiments, the background may represent one or more static objects (e.g., a building, a streetlight, etc.) the locations of which may be not changed. The foreground may represent one or more mobile objects (e.g., a pedestrian, a vehicle, an animal, etc.). For different conditions, the one or more objects appearing in the scene may be different. For example, when the scene related to outdoor environment is recorded by the visual sensor on a rainy day, the scene may represent raindrops. When the scene related to a museum is recorded by the visual sensor after 11:00 pm when the museum is closed, only a few staff may periodically patrol the museum and appear in the scene. If the scene is related to an entrance to a house, one or more mobile objects with one or more specific characteristics (e.g., heights) may appear on the scene to in and/or out of the house at a specific time period. If the scene is related to a road, the sky, the skyline, trees, cloud, etc., may appear in the scene. If the scene is related to a road, the sky, the skyline, trees, cloud, etc., may appear in the scene.

In some embodiments, the processing device 100 may in real-time obtain the plurality of training samples from the visual sensor. As used herein, the obtaining in real-time the plurality of training samples may refer to that the plurality of training samples may be collected and/or sampled at an acquisition frequency (also referred to as an acquisition speed or sampling frequency) and transmitted to the processing device 100 when (or before) the plurality of training samples were generated by the visual sensor. The acquisition frequency may be set by an operator or according to a default setting of the system 100. In some embodiments, the processing device 100 may obtain the plurality of training samples periodically. For example, the processing device 100 may obtain the plurality of training samples from the storage device 780, a storage device installed in the visual sensor, etc., in a certain period, such as every day, every hour, etc.

In 604, the processing device 100 (e.g., the object detection module 504 and/or behavior analyzing unit 304) may detect one or more subjects from the historical video for each of the plurality of training samples. In some embodiments, the processing device 100 may detect the one or more subjects from the historical video using an object detection algorithm and/or a trained machine learning model for object detection as described in FIG. 2. In some embodiments, the one or more subjects detected from the historical video may be marked by a bounding box in each of at least a portion of frames in the historical video. The bounding box may refer to a box enclosing at least a portion of the detected subject in a frame. The bounding box may be of any shape and/or size. For example, the bounding box may have the shape of a square, a rectangle, a triangle, a polygon, a circle, an ellipse, an irregular shape, or the like. The same subject presented in different frames may be designated with the same number or marked by bounding boxes with same colors.

In some embodiments, the processing device 100 may determine one or more moving subjects from the one or more subjects detected from the historical video. In some embodiments, the processing device 100 may analyze behavior features of each of the one or more subjects as described in operation 404 as illustrated in FIG. 4. The behavior features may be depicted by various parameters including a distance, a speed, a direction, a change of shape or size, an intensity, and/or a moving trace, an acceleration, a trajectory movement amplitude, movement frequency, or voice information, or the like, or any combination thereof. For example, if the processing device 100 determines that the distance of locations of a subject corresponding to two frames exceeds a threshold, the processing device 100 may determine that the subject is a moving subject. In some embodiments, the processing device 100 may determine an estimated category of the subject based on the determined parameters. For example, the processing device 100 may determine that a subject is a car if the speed of the subject exceeds a threshold (e.g., 40 km/h). As another example, the processing device 100 may determine that a subject is a pedestrian if the speed of the subject in a range (e.g., 1 km/h-4 km/h). In some embodiments, the processing device 100 may further determine whether each of the one or more subjects is a moving subject of interest based on the behavior features of the each of one or more subjects. For example, the processing device 100 may determine that a subject with the speed exceeding a threshold (e.g., 100 km/h) is a moving of interest.

In some embodiments, the plurality of training samples may include the first portion and a second portion. Each training sample in the first portion may include a historical video representing a subject of a certain category, for example, vehicle, human, animal, etc. Each training sample in the second portion may include a historical video representing no subjects of the certain category. For example, if the each training sample in the first portion includes a historical video representing a vehicle, each training sample in the second portion may include a historical video representing a tree, a road, a street lamp, etc. Each of the plurality of training samples may include the historical video with the one or more subjects that may be marked.

In 606, the processing device 100 (e.g., the training module 506) may train a self-learning model based on the plurality of training samples to obtain the trained self-learning model.

The processing device 100 may train the self-learning model (also referred to as a self-taught learning model) based on the plurality of training samples each of which with the one or more marked subjects. The each of the plurality of training samples with the one or more marked subjects may serve as the input of the self-learning model in the training process. The processing device 100 may learn information associated with the one or more subjects detected from each of the first portion of the plurality of training samples. The processing device 100 may train the self-learning model based on the information associated with the one or more marked and/or detected subjects. The information associated with a detected subject may include time information when the detected subject was recorded by the historical video, spatial information associated with the detected subject, weather information when the detected subject was recorded by the historical video; or motion information of the detected motion subject, etc. The time information associated with a detected subject may include a time point and/or time period when the detected subject appeared in the scene recorded by the visual sensor. The spatial information associated with the detected subject may include a location (e.g., a geographical location) of the detected subject and/or a location relationship between the detected subject and a reference subject. For example, the spatial information may include a moving trajectory of the detected subject, i.e., the change of the location of the detected subject with time. As a further example, if the detected subject is a static subject, the location of the detected subject may be substantially unchanged. If the detected subject is a mobile subject, the location of the detected subject may be changed. The movement information associated with the detected subject may include one or more parameters of the movement (i.e., movement parameters) of the detected subject. For example, the movement information may include the speed, an acceleration, a trajectory, a movement amplitude, a direction, a movement frequency, or other information of the detected subject.

In the training process of the self-learning model, the self-learning model may learn and/or generalize regular patterns associated with the scene recorded by the historical video from the information associated with the one or more subjects detected from each of the plurality of training samples. The learned and/or generalized regular patterns may form a knowledge base associated with what the visual sensor has been recorded. The knowledge base may be also referred to as a scene profile describing the scene recorded by the visual sensor. For example, the regular patterns may include habits of a subject, natural laws, moving characteristics of a subject, inherent properties of a subject or the scene, etc. The habits of a subject may include dressing habits, routines, etc. The inherent properties of a subject may include appearance characteristics (e.g., height, hair color, size, shape, etc.). The inherent properties of the scene may include that the outdoor scene includes grasses, roads, sky, vehicles, telegraph poles, etc., the indoor scene includes ceilings, walls, chairs, sofas, etc. The one or more parameters or constraints may also include the sizes and shapes of typical objects, e.g., human faces, human body, etc. The natural laws may include natural phenomena such as people and cars are on the ground, nights are generally darker than days, people can either be vertical (standing) or horizontal (lying) in the videos while the cars are normally horizontal, etc. The regular patterns may be learned depending on time, weather, location, etc. For example, the self-learning model may learn the regular patterns (e.g., moving characteristics) of different objects appearing in the scene captured by the visual sensor at different times, different locations, different weathers, etc. For example, the scene may be determined as a general result e.g., indoor, outdoor, morning, afternoon, rainy, etc. Alternatively, the scene may be determined as a detailed result e.g., a gym at 9-10 am, a library at 3-4 pm, etc. In some embodiments, subjects associated with a certain scene, e.g., a telegraph pole associated with an outdoor scene, a treadmill associated with a gym, etc., may be learned as inherent properties.

In some embodiments, the self-learning model may be constructed based on a machine learning model, such as a deep learning model (e.g., a deformable parts model (DPM), an overfeat network, a spatial pyramid pooling network (SPPNet), a convolutional neural network (CNN), a regions with CNN (R-CNN), a fully convolutional network (FCN), a you only look once (YOLO) network, etc.), a regression model (e.g., a support vector machine). In some embodiments, the self-learning model may include using a self-taught multiple-instance learning algorithm, a sparse non-negative pattern learning algorithm an exponential family sparse coding algorithm, etc. In some embodiments, in the training process of the self-learning model, the processing device 100 may extract image features of a detected subject using, for example, a sparse coding optimization algorithm. The image features may be described as one or more base vectors describing the image features of the subject. Then, the processing device 100 may train the self-learning model based on the base vector using a support vector machine (e.g., an SVM). At last, the processing device 100 may use the trained classifier to predict the category of the subject to be classified.

In some embodiments, the trained self-learning model includes a first part relating to reference knowledge of different scenes and a second part relating to learned knowledge generated from the training process of the trained self-learning model. The reference knowledge may include known knowledge or inherent knowledge associated with the scene. The reference knowledge may be also referred to as background knowledge. The reference knowledge may describe the general property of the world. The general property of the world may include that the outdoor scene may include grasses, roads, sky, vehicles, telegraph poles, etc., the indoor scene may include ceilings, walls, chairs, sofas, etc. The general property of the world may also include the sizes and shapes of typical objects, e.g., human faces, human body, etc. The general property of the world may further include nature phenomena such as people and cars are on the ground, nights are generally darker than days, people can either be vertical (standing) or horizontal (lying) in the videos while the cars are normally horizontal, etc.

In 608, the processing device 100 (e.g., the acquisition module 502) may update a training set for the trained self-learning model. In 610, the processing device 100 (e.g., the training module 506) may update the trained self-learning model using the updated training set. In some embodiments, the visual sensor may collect videos continuously. Within a short time after the visual sensor was installed, the plurality of training samples collected by the visual sensor may be not enough, e.g., the count or number of the plurality of training samples is smaller than a threshold, to train the self-learning model with improved accuracy. In other words, the knowledge base associated with the scene collected by the videos may include poor accuracy. With the increase of video data acquired by the visual sensor, training samples may be increased, the trained self-learning model may have improved accuracy.

In some embodiments, the processing device 100 may acquire new video data collected by the visual sensor generate in a time period after the last training of the trained self-learning model. The new video data may be used to update the training set of the trained self-learning model. For example, the processing device 100 may use the new video data to replace the training data used in the last training of the trained self-learning model. In some embodiments, the processing device 100 may in real-time update the training set of the trained self-learning model. For example, the processing device 100 installed in the visual sensor may in real-time acquire the new video data collected by the visual sensor and use the new video data to train the trained self-learning model continuously. In some embodiments, the processing device 100 may update the training set of the trained self-learning model periodically, such as one day, one week, one month, etc. In some embodiments, the processing device 100 may update the training set of the trained self-learning model in response to receipt of a request for updating the trained self-learning model.

In some embodiments, the trained self-learning model may be resubmitted to the processing device 100. The resubmitted self-learning model may be refined by the processing device 100 such that it is improved (e.g., to produce an improved accuracy when using the trained self-learning model). As disclosed herein, a self-learning model may be used by one or more classifiers to generate image features contained within the one or more subjects. The image features may be collected across multiple motion subjects in the resubmitted round, and a new model may be generated based on them. Here, the original model generated based on the original labeled samples may be updated based on using the original self-learning model within the processing device 100 and generating a new self-learning model based on the original self-learning model. A round of training the trained self-learning model may be provided using new unlabeled examples, or a combination of new and original labeled examples.

In some embodiments, the trained self-learning model obtained in operation 606 may be used to determine and/or detect one or more moving of interest. The processing device 100 may generate an alarm corresponding to the detected moving of interest. The processing device 100 may update the training set of the trained self-learning model based on the predicted result and/or the alarm. For example, the processing device 100 may collect alarms and output them to an observer (e.g., the householder) e to be further verified. If the observer confirms that an alarm is incorrect, the processing device 100 may determine the alarm as false alarm and filter out the alarm when a similar thing is noticed in the videos in future. In some embodiments, the processing device 100 may not need the observer to verify the alarm but may self-confirm that the alarm is a false alarm when the thing that caused the alarm is repeatedly noticed. For example, if the processing device 100 generates an alarm every day at sunset when the shadow of the trees passing through a window of the house. The processing device 100 may determine that the alarm is a false alarm (as even if it doesn't know the alarm is caused by the shadow of the trees which is harmless, it may believe that the criminal wouldn't come to the house at the same time every day), and filter out the alarm when a similar thing is noticed in the videos. The processing device 100 may update the training set using the videos corresponding to the false alarms.

Figure 7:
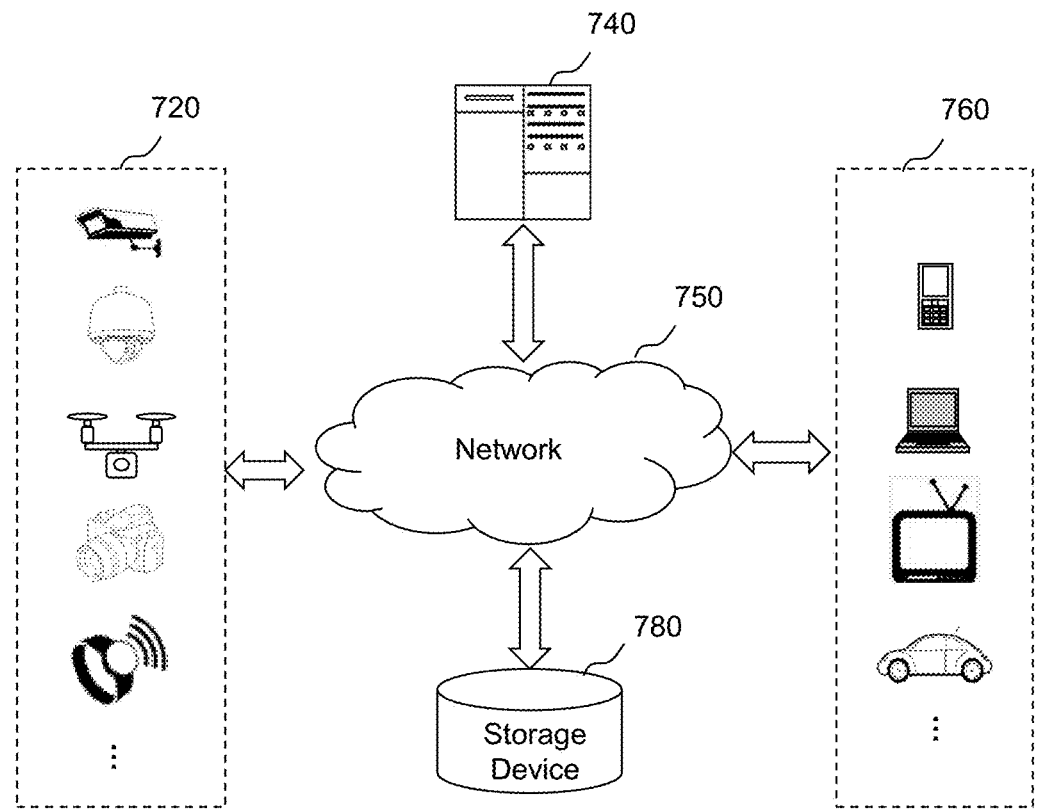
FIG. 7 is a schematic diagram illustrating a video surveillance system according to some embodiments of the present disclosure.

FIG. 7 is a schematic diagram illustrating a video surveillance system 700 according to some embodiments of the present disclosure. As shown, the video surveillance system 700 may include a visual sensor 720, a processing device 740, a network 750, one or more terminal(s) 760, and a storage device 780. In some embodiments, the visual sensor 720, the processing device 740, the storage device 780, and/or the terminal(s) 760 may be connected to and/or communicate with each other via a wireless connection (e.g., the network 750), a wired connection, or a combination thereof. The connection between the components in the video surveillance system 700 may be variable. Merely by way of example, the visual sensor 720 may be connected to the processing device 740 through the network 750, as illustrated in FIG. 7. As another example, the visual sensor 720 may be connected to the processing device 740 directly. As a further example, the storage device 780 may be connected to the processing device 740 through the network 750, as illustrated in FIG. 7, or connected to the processing device 740 directly. As still a further example, the terminal(s) 760 may be connected to the processing device 740 through the network 750, as illustrated in FIG. 7, or connected to the processing device 740 directly.

The visual sensor 720 may be positioned to collect one or more image data (e.g., a video, an image, etc.). In some embodiments, the visual sensor 720 may be positioned indoors or outdoors. For example, the visual sensor may be positioned at home, shopping mall, street, park, subway station, museum, etc. In some embodiments, the visual sensor 720 may detect one or more objects from the video. For example, the object may include a person, a vehicle, an animal, a physical subject, or the like, or a combination thereof.

In some embodiments, the visual sensor 720 may be also referred to as a video camera. As used herein, a visual sensor or a video camera may refer to an apparatus for visual recording. For example, the video camera may include a color camera, a digital video camera, a camera, a camcorder, a PC camera, a webcam, an infrared (IR) video camera, a low-light video camera, a thermal video camera, a CCTV camera, a pan, a tilt, a zoom (PTZ) camera, a video sensing device, or the like, or a combination thereof. In some embodiments, the visual sensor 720 may be installed in various places to monitor an area of interest. In some embodiments, the visual sensor 720 may be embedded an unmanned aerial vehicle (UAV). In some embodiments, the visual sensor 720 may be integrated into the terminal(s) 760.

The processing device 740 may process data and/or information obtained from the visual sensor 720, the storage device 780, and/or the terminal(s) 760. The processing device 740 may perform one or more functions as the processing device 100 as described elsewhere in the present disclosure. For example, the processing device 740 may determine a target moving object of interest from image data collected by the visual sensor 720. As another example, the processing device 740 may determine the target moving object of interest based on a self-learning model for object detection and/or behavior features of one or more objects detected from the image data. The self-learning model for object detection may be acquired by the processing device 740 or another processing device different from the processing device 740 learning from historical image data collected by the visual sensor 720. As still another example, the processing device 740 may calibrate the visual sensor 720 based on the target moving object of interest or any other object detected from the image data. In some embodiments, the processing device 740 may generate feedback in response to detect one or more moving objects.

The self-learning model for object detection may be updated from time to time, e.g., periodically or not, based on, for example, image data collected by the visual sensor 720. In some embodiments, the determination and/or updating and the application of the self-learning model for object detection may be performed on the same processing device (e.g., a processor installed on the visual sensor 720). In some embodiments, the determination and/or updating of the self-learning model for object detection may be performed on a processing device (e.g., a processor installed on the visual sensor 720), while the application of the self-learning model for object detection may be performed on a different processing device. In some embodiments, the determination and/or updating of the self-learning model for object detection may be performed on a processing device of a system different than the system 100 on which the application of the self-learning model for object detection is performed. For instance, the determination and/or updating of the self-learning model for object detection may be performed on a first system of a vendor who provides and/or maintains such a machine learning model and/or has access to training samples used to determine and/or update the self-learning model for object detection, while object detection based on the provided self-learning model for object detection may be performed on a second system of a client of the vendor. In some embodiments, the determination and/or updating of the self-learning model for object detection may be performed online in response to a request for object detection. In some embodiments, the determination and/or updating of the self-learning model for object detection may be performed offline. In some embodiments, the processing device 740 may be a single server or a server group. The server group may be centralized or distributed. In some embodiments, the processing device 740 may be local or remote. For example, the processing device 740 may access information and/or data from the surveillance device 120, the storage device 780, and/or the terminal(s) 760 via the network 750. As another example, the processing device 740 may be directly connected to the visual sensor 720, the terminal(s) 760, and/or the storage device 780 to access information and/or data. In some embodiments, the processing device 740 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 740 may be implemented by a computing device 800 having one or more components as described in connection with FIG. 8.

The storage device 780 may store data, instructions, and/or any other information. In some embodiments, the storage device 780 may store data obtained from the processing device 740, and the terminal(s) 760. In some embodiments, the storage device 780 may store data and/or instructions that the processing device 740 may execute or use to perform exemplary methods described in the present disclosure. In some embodiments, the storage device 780 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 780 may be implemented on a cloud platform as described elsewhere in the disclosure.

In some embodiments, the storage device 780 may be connected to the network 750 to communicate with one or more other components in the video surveillance system 700 (e.g., the processing device 740, the terminal(s) 760, etc.). One or more components in the video surveillance system 700 may access the data or instructions stored in the storage device 780 via the network 750. In some embodiments, the storage device 780 may be part of the processing device 740.

The terminal(s) 760 may be connected to and/or communicate with the visual sensor 720, the processing device 740, and/or the storage device 780. For example, the terminal(s) 760 may obtain feedback from the processing device 740. As another example, the feedback may include a notification (e.g., an alarm) indicating that a moving object exists. A user may determine whether the moving object is a moving object of interest, for example, having an anomaly regarding the behavior of the moving object, in response to receiving the notification via the terminal(s) 760. The terminal(s) 760 may transmit the determination of the user to the processing device 740. If the user confirms that the notification is correct, the processing device 740 may generate a similar notification when it notices the same thing in the image data in future. If the user confirms that the notification is incorrect, the processing device 740 may determine the notification as false notification and filter out the notification when a similar thing is noticed in the videos in the future. The processing device 740 may also update the self-learning model for object detection by learning from the false notification and learn that the moving object is not a moving object of interest. In some embodiments, the terminal(s) 760 may include a mobile device, a tablet computer, a laptop computer, or the like, or any combination thereof. For example, the mobile device may include a mobile phone, personal digital assistants (PDA), a gaming device, a navigation device, a point of sale (POS) device, a laptop, a tablet computer, a desktop, or the like, or any combination thereof. In some embodiments, the terminal(s) 760 may include an input device, an output device, etc. The input device may include alphanumeric and other keys that may be input via a keyboard, a touch screen (for example, with haptics or tactile feedback), a speech input, an eye-tracking input, a brain monitoring system, or any other comparable input mechanism. The input information received through the input device may be transmitted to the processing device 740 via, for example, a bus, for further processing. Other types of input devices may include a cursor control device, such as a mouse, a trackball, or cursor direction keys, etc. The output device may include a display, a speaker, a printer, or the like, or a combination thereof. In some embodiments, the terminal(s) 760 may be part of the processing device 740.

The network 750 may include any suitable network that can facilitate the exchange of information and/or data for the video surveillance system 700. In some embodiments, one or more components of the video surveillance system 700 (e.g., the visual sensor 720, the processing device 740, the storage device 780, the terminal(s) 760, etc.) may communicate information and/or data with one or more other components of the video surveillance system 700 via the network 750. For example, the processing device 740 may obtain image data from the surveillance device 120 via the network 750. As another example, the processing device 740 may obtain user instruction(s) from the terminal(s) 760 via the network 750. The network 750 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, switches, server computers, and/or any combination thereof. For example, the network 750 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 750 may include one or more network access points. For example, the network 750 may include wired and/or wireless network access points such as base stations and/or internet exchange points through which one or more components of the video surveillance system 700 may be connected to the network 750 to exchange data and/or information.

The above description of the video surveillance system 700 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 780 may be a data storage including cloud computing platforms, such as public cloud, private cloud, community, and hybrid clouds, etc. However, those variations and modifications do not depart the scope of the present disclosure.

FIG. 8 is a schematic diagram illustrating exemplary hardware and/or software components of a computing device 800 on which the processing engine may be implemented according to some embodiments of the present disclosure.

The computing device 800 may be used to implement any component of the video surveillance system 700 as described herein. For example, the processing device 740 and/or the terminal 750 may be implemented on the computing device 800, respectively, via its hardware, software program, firmware, or a combination thereof. Although only one such computing device is shown, for convenience, the computer functions relating to the video surveillance system 700 as described herein may be implemented in a distributed fashion on a number of similar platforms, to distribute the processing load. As illustrated in FIG. 8, the computing device 800 may include a processor 810, a storage 820, an input/output (I/O) 830, and a communication port 840.

The processor 810 may execute computer instructions (e.g., program code) and perform functions of the processing device 740 in accordance with techniques described herein. The computer instructions may include, for example, routines, programs, objects, components, data structures, procedures, modules, and functions, which perform particular functions described herein. For example, the processor 810 may process image data obtained from the visual sensor 720, the terminal(s) 760, the storage device 780, and/or any other component of the video surveillance system 700. In some embodiments, the processor 810 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 800. However, it should be noted that the computing device 800 in the present disclosure may also include multiple processors, thus operations and/or method operations that are performed by one processor as described in the present disclosure may also be jointly or separately performed by the multiple processors. For example, if in the present disclosure the processor of the computing device 800 executes both operations A and operation B, it should be understood that operation A and operation B may also be performed by two or more different processors jointly or separately in the computing device 800 (e.g., a first processor executes operation A and a second processor executes operation B, or the first and second processors jointly execute operations A and B).

The storage 780 may store data/information obtained from the visual sensor 720, the terminal(s) 760, the storage device 780, and/or any other component of the video surveillance system 700. In some embodiments, the storage device 780 may include a mass storage device, a removable storage device, a volatile read-and-write memory, a read-only memory (ROM), or the like, or any combination thereof. In some embodiments, the storage device 780 may store one or more programs and/or instructions to perform exemplary methods described in the present disclosure. For example, the storage device 780 may store a program for the processing device 740 to execute to generate a self-learning model.

The I/O 830 may input and/or output signals, data, information, etc. In some embodiments, the I/O 830 may enable a user interaction with the processing device 740. In some embodiments, the I/O 830 may include an input device and an output device. The input device may include alphanumeric and other keys that may be input via a keyboard, a touch screen (for example, with haptics or tactile feedback), a speech input, an eye-tracking input, a brain monitoring system, or any other comparable input mechanism. The input information received through the input device may be transmitted to another component (e.g., the processing device 740) via, for example, a bus, for further processing. Other types of input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 840 may be connected to a network (e.g., the network 750) to facilitate data communications. The communication port 840 may establish connections between the processing device 740 and the visual sensor 720, the terminal(s) 760, and/or the storage device 780. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 840 may be and/or include a standardized communication port, such as RS232, RS485, etc. In some embodiments, the communication port 840 may be a specially designed communication port. For example, the communication port 840 may be designed in accordance with the digital imaging and communications in medicine (DICOM) protocol.

FIG. 9 is a schematic diagram illustrating exemplary hardware and/or software components of a mobile device 900 on which the terminal(s) may be implemented according to some embodiments of the present disclosure.

In some embodiments, one or more components (e.g., a terminal 760 and/or the processing device 740) of the video surveillance system 700 may be implemented on the mobile device 900.

As illustrated in FIG. 9, the mobile device 900 may include a communication platform 910, a display 920, a graphics processing unit (GPU) 930, a central processing unit (CPU) 940, an I/O 950, a memory 960, and a storage 970. In some embodiments, any other suitable component, including but not limited to a system bus or a controller (not shown), may also be included in the mobile device 900. In some embodiments, a mobile operating system 980 (e.g., iOS™, Android™, Windows Phone™) and one or more applications 990 may be loaded into the memory 960 from the storage 970 in order to be executed by the CPU 940. The applications 990 may include a browser or any other suitable mobile apps for receiving and rendering information relating to image processing or other information from the processing device 740. User interactions with the information stream may be achieved via the I/O 950 and provided to the processing device 740 and/or other components of the video surveillance system 700 via the network 750.

Example 1

The smart motion detection system may be implemented in a museum. The museum may include a plurality of treasures that are located in particular positions of the museum. The plurality of treasures may be designated as relative static objects in the smart detection system. The smart detection system may detect the motions of the treasures and/or movements of other objects (e.g., staff, visitors) in the museum. For example, at 11:00 pm, the museum may be closed and only a few staff (or referred to as observer) may periodically patrol the treasures. When the smart motion detection system detects a person entering the museum, the smart motion detection system may generate an alarm. The smart motion detection system may determine whether the detected person is a staff of the museum. For example, the smart motion detection system may determine whether the detected person is a staff of the museum by recognizing the facial and/or working suits of the person. In some embodiments, the detected person may be a new staff of the museum and does not wear working suits, the motion object of interest determination module 106 may further analyze the motion of the detected person. For example, the motion object of interest determination module 106 may detect that the detected person is moving the treasures. In response to the determination that one or more treasures are moved by the detected person, the communication module may transmit the alarm to the observer of the museum. As another example, the motion object of interest determination module 106 may compare the motion of the detected person with a normal motion of a staff to determine whether his motion is abnormal or whether he is just patrolling like other staff.

Example 2

The smart motion detection system may be implemented in a hospital for patient monitoring and alerting. Taking an epilepsy patient (or people with seizures) as an example; the smart motion detection system may capture videos of the epilepsy patient, analyze the motion of the epilepsy patient in captured videos and immediately transmit an alarm to outside doctors or observers of the epilepsy patient when an abnormal motion is detected. For example, when the smart motion detection system detects that the epilepsy patient performs an abnormal motion, the alarm generation module may generate an alarm. The feedback module 108 may further determine whether the abnormal motion relates to a seizure caused by epilepsy or relates to normal activities (e.g., dancing, jumping). In response to the determination that the abnormal motion relates to a seizure caused by epilepsy, the smart motion detection system may determine that the patient has a seizure and the communication module may transmit the alarm to the outside doctor or observer. In a case that a doctor is not available or the epilepsy patient is outside the hospital, the communication module may dial emergency numbers for the epilepsy patient. In response to the determination that the abnormal motion does not relate to a seizure caused by epilepsy, the smart motion detection system may determine that the alarm is a false alarm and the communication module may not transmit the alarm to the doctor.

Example 3

The smart motion detection system may be implemented in an unmanned factory for monitoring assembly lines. The unmanned factory may usually include a plurality of assembly lines producing 24 hours a day. In some embodiments, when one of the assembly lines suddenly breaks down, productions of the unmanned factory may be affected and may require manual intervention. The smart motion detection system may generate an alarm to a monitor of the factory. For example, there may be a plurality of products on an assembly line that is delivering towards one or more locations on the assembly line, the smart motion detection system may continuously detect the motions of the products. When one of the assembly lines breaks down, the products may fall off the assembly line or move abnormally. The motion object of interest determination module 106 may detect the abnormal motion of the products and the alarm generation module may generate an alarm. For example, the feedback module 108 may determine whether the alarm is a false alarm by determining whether the falling off location is actually a desired location on the assembly line. In response to the determination that the falling off location is a desired location on the assembly line, the feedback module 108 may designate the alarm as a false alarm and filter out the alarm. In response to the determination that the falling off location is not of any desired locations on the assembly lines, the feedback module 108 may designate the alarm as a true alarm and the communication module may transmit the alarm to the monitor of the factory.

Example 4

The smart motion detection system may be implemented on a vehicle for monitoring the motion of the vehicle itself and/or surrounding traffics. For example, the smart motion detection system may capture videos of the vehicle and may determine a motion of the vehicle based on the captured videos. The motion of the vehicle may include the speed, the direction, and/or the moving trace of the vehicle. Merely by way of example, a motion of the vehicle may be determined to be abnormal if the speed of the vehicle exceeds a speed limit, the vehicle is turning left or right while it's not allowed, and/or the vehicle is moving with an "S" shape (which may indicate that the driver may be drunk or tired). In some embodiments, the surrounding traffics may be determined to be abnormal if the surrounding vehicles are turning to the traffic lane that the vehicle is currently driving on, and/or vehicles in the front suddenly stop. When the smart motion detection system detects the abnormal motion, the smart motion detection system may generate an alarm to notify the driver of the vehicle.

To implement various modules, units, and functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system, comprising:
   a storage device storing a set of instructions; and
   at least one processor configured to communicate with the storage device, wherein when executing the set of instructions, the at least one processor is directed to cause the system to perform operations including:
      obtaining a video collected by a visual sensor, the video including a plurality of frames;
      detecting, in at least a portion of the plurality of frames, one or more objects from the video;
      determining, with a trained self-learning model, a first detection result associated with the one or more objects;
      determining, based on the at least a portion of the plurality of frames, one or more behavior features associated with each of the one or more objects;
      determining, based on the one or more behavior features associated with each of the one or more objects, a second detection result associated with each of the one or more objects; and
      determining, based on the first detection result and the second detection result, a tartlet moving object of interest from the one or more objects, wherein the trained self-learning model is provided based on a plurality of training samples collected by the visual sensor.

2. The system of claim 1, wherein to detect, in at least a portion of the plurality of frames, one or more objects from the video, the at least one processor is directed to cause the system to perform the operations including:
   detecting the one or more objects from the video using an object detection model.

3. The system of claim 2, wherein the object detection model is constructed based on a deep learning model.

4. The system of claim 1, wherein to determine, based on the at least a portion of the plurality of frames, one or more behavior features associated with each of the one or more objects, the at least one processor is directed to cause the system to perform the operations including:
   determining, based on the at least a portion of the plurality of frames and a prior calibration model of the visual sensor determined in a last calibration, the one or more behavior features.

5. The system of claim 1, wherein the one or more behavior features of the one or more objects include at least one of a speed, an acceleration, a trajectory, a movement amplitude, a direction, a movement frequency, or voice information.

6. The system of claim 1, wherein the trained self-learning model is generated by a process including:
   obtaining the plurality of training samples each of which includes a historical video collected by the visual sensor;
   detecting one or more motion subjects from the historical video for each of the plurality of training samples; and
   training a self-learning model using information associated with the detected one or more motion subjects to obtain the trained self-learning model.

7. The system of claim 6, wherein the information associated with the detected one or more motion subjects includes at least one of:
   time information when the detected one or more motion subjects recorded by the historical video;
   spatial information associated with the detected one or more motion subjects;
   weather information when the detected one or more motion subjects recorded by the historical video; or
   motion information of the detected one or more motion subjects.

8. The system of claim 1, wherein the trained self-learning model includes a first part relating to reference knowledge of different scenes and a second part relating to learned knowledge generated from a training process of the trained self-learning model.

9. The system of claim 8, wherein the reference knowledge of different scenes includes characteristics of one or more subjects appearing in each of the different scenes.

10. The system of claim 1, wherein the first detection result includes one or more first candidate moving objects of interest and the second detection result includes one or more second candidate moving objects of interest, and to determine, based on the first detection result and the second detection result, the target moving object of interest from the one or more objects, the at least one processor is directed to cause the system to perform the operations including:
    designating a same candidate moving object of interest from the one or more first candidate moving objects of interest and the one or more second candidate moving objects of interest as the target moving object of interest.

11. The system of claim 1, wherein the first detection result includes a first probability that each of the one or more objects is a moving object of interest, the second detection result includes a second probability that each of the one or more objects is a moving object of interest, and to determine, based on the first detection result and the second detection result, the target moving object of interest from the one or more objects, the at least one processor is directed to cause the system to perform the operations including:
    designating a moving object having a first probability exceeding a first threshold and a second probability exceeding a second threshold as the target moving object of interest.

12. The system of claim 1, wherein the at least one processor is directed to cause the system to perform additional operations including:
    in response to a detection of the target moving object of interest from the video, generating feedback relating to the detection of the target moving object of interest; and
    transmitting the feedback relating to the detection of the target moving object of interest to a terminal.

13. The system of claim 12, wherein the feedback includes a notification indicating that a moving object exists.

14. The system of claim 1, wherein the at least one processor is directed to cause the system to perform additional operations including:
    in response to a detection of each of at least a portion of the one or more objects from the video, generating candidate feedbacks each of which relates to the detection of one of the one or more objects;
    determining, based on at least one of the first detection result or the second detection result, target feedback from the candidate feedbacks; and
    transmitting the target feedback to a terminal.

15. The system of claim 1, wherein the at least one processor is further configured to cause the system to perform additional operations including:
    determining, based on the target moving object of interest, a calibration model of the visual sensor, the calibration model describing a transform relationship between a two-dimensional (2D) coordinate system and a three-dimensional (3D) coordinate system of the visual sensor.

16. The system of claim 15, wherein to determine, based on the target moving object of interest, a calibration model of the visual sensor, the at least one processor is further configured to cause the system to perform the additional operations including:
    determining, based on the at least a portion of the plurality of frames, an estimated value of a characteristic of the target moving object of interest denoted by the 2D coordinate system; and
    determining, based on the estimated value and a reference value of the characteristic of the target moving object of interest denoted by the 3D coordinate system, the calibration model.

17. The system of claim 16, wherein the characteristic of the target moving object of interest includes a physical size of at least a portion of the target moving object of interest.

18. The system of claim 1, wherein the target moving object of interest includes at least one of a person, a vehicle, or an animal whose motion includes an anomaly.

19. A method implemented on a computing device having at least one processor and at least one computer-readable storage medium for abnormal scene detection, the method comprising:
    obtaining a video collected by a visual sensor, the video including a plurality of frames;
    detecting, in at least a portion of the plurality of frames, one or more objects from the video;
    determining, with a trained self-learning model, a first detection result associated with the one or more objects;
    determining, based on the at least a portion of the plurality of frames, one or more behavior features associated with each of the one or more objects;
    determining, based on the one or more behavior features associated with each of the one or more objects, a second detection result associated with each of the one or more objects; and
    determining, based on the first detection result and the second detection result, a target moving object of interest from the one or more objects, wherein the trained self-learning model is provided based on a plurality of training samples collected by the visual sensor.

20. A non-transitory computer readable medium, comprising:
    instructions being executed by at least one processor, causing the at least one processor to implement a method, comprising:
        obtaining a video collected by a visual sensor, the video including a plurality of frames;
        detecting, in at least a portion of the plurality of frames, one or more objects from the video;
        determining, with a trained self-learning model, a first detection result associated with the one or more objects;
        determining, based on the at least a portion of the plurality of frames, one or more behavior features associated with each of the one or more objects;

determining, based on the one or more behavior features associated with each of the one or more objects, a second detection result associated with each of the one or more objects; and determining, based on the first detection result and the second detection result, a target moving object of interest from the one or more objects, wherein the trained self-learning model is provided based on a plurality of training samples collected by the visual sensor.

* * * * *